(12) United States Patent
Ikeda

(10) Patent No.: US 7,430,375 B2
(45) Date of Patent: Sep. 30, 2008

(54) OPTICAL TRANSCEIVER

(75) Inventor: Takeshi Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 10/728,613

(22) Filed: Dec. 5, 2003

(65) Prior Publication Data
US 2005/0019038 A1    Jan. 27, 2005

(30) Foreign Application Priority Data
Dec. 6, 2002    (JP)    ............ P2002-355413

(51) Int. Cl.
*H04B 10/00*    (2006.01)
(52) U.S. Cl. .................. 398/139; 398/138; 398/135
(58) Field of Classification Search ............... 398/134, 398/135–139, 142
See application file for complete search history.

(56) References Cited

U.S. PATENT DOCUMENTS

| | | | | |
|---|---|---|---|---|
| 4,493,113 A | * | 1/1985 | Forrest et al. | ............... 398/139 |
| 6,203,212 B1 | * | 3/2001 | Rosenberg et al. | ............ 385/92 |
| 6,527,457 B2 | * | 3/2003 | Chan et al. | ............ 385/89 |
| 6,721,503 B1 | * | 4/2004 | Jokerst et al. | ............ 398/41 |
| 7,049,570 B2 | * | 5/2006 | Cham et al. | ............ 250/201.1 |
| 2002/0157862 A1 | * | 10/2002 | Nishii | ............ 174/255 |
| 2004/0051028 A1 | * | 3/2004 | Cham et al. | ............ 250/201.1 |

\* cited by examiner

*Primary Examiner*—Agustin Bello
(74) *Attorney, Agent, or Firm*—Sonnenschein Nath & Rosenthal LLP

(57) ABSTRACT

This invention provides an optical transceiver that can attain a single-wire two-way communication in a simple structure. In an optical integrated chip, a light emitting element and a light receiving element are formed on the same chip, and a light emitting section and a light receiving section are closely placed. A via hole into which an optical fiber is inserted is penetrated in a circuit board. The optical integrated chip is mounted on a rear of the circuit board, at a position where the light emitting and receiving sections are fitted into the via hole. The optical fiber is inserted into the via hole, from the surface of the circuit board. Thus, light from the light emitting section is inputted to the optical fiber, and light from the optical fiber is inputted to the light receiving section. Hence, the single-wire two-way communication is attained.

10 Claims, 20 Drawing Sheets

OPTICAL TRANSCEIVER

CROSS REFERENCE TO RELATED APPLICATION

This application claims priority from Japanese Priority Document No. 2002-355413, filed on Dec. 6, 2002 with the Japanese Patent Office, which document is hereby incorporated by reference.

BACKGROUND OF THE INVENTION

1. Field of the Invention

The present invention relates to an optical transceiver for carrying out a single-wire two-way communication by using an optical fiber. In detail, the present invention particularly relates to an optical transceiver, wherein an optical fiber is fixed by inserting into a via hole formed in a circuit board, and an optical integration chip on which a light emitting element and a light receiving element are formed on the same chip is mounted oppositely to the via hole, and thereby a single-wire two-way communication is carried out in a simple structure.

2. Description of Related Art

An apparatus for carrying out an optical communication using an optical fiber is provided with an optical transceiver for outputting to the optical fiber by converting an electric signal into an optical signal through a light emitting element, and converting an optical signal from the optical fiber into an electric signal through a light receiving element for outputting.

The conventional optical transceiver is typically designed such that each of the light emitting element and the light receiving element is mounted on an individual metallic can package or a silicon sub-mount, and the respective element is individually adjusted and fixed so as to obtain the excellent optical coupling with the optical fiber.

Also in a system where a single optical fiber is not only used as an optical fiber through which a transmitting light emitted from the light emitting element is passed, but also used as an optical fiber through which an externally receiving light is passed, namely, a so-called single-wire two-way communication system, the system requires a lens for collecting lights, a beam splitter for separating optical paths, and the like in addition to the light emitting element and the light receiving element (for example, refer to a patent document 1: Japanese Laid Open Patent Application JP-A-Heisei, 9-325245).

FIG. 21 is a plan view showing a configuration example of the conventional optical transceiver. A transmitting light emitted from a light emitting element 100 is collected by a lens 101, transmitted through a beam splitter 102, and inputted to a core section of an optical fiber 103, and then propagated. Also, a receiving light transmitted through the optical fiber 103 from external is reflected by the beam splitter 102, and the optical path is separated from that of the transmitting light. Then, the receiving light is inputted to a light receiving element 104, and converted into an electric signal.

However, in the conventional optical transceiver, individual adjusting and fixing works for each of the light emitting element and the light receiving element were required relative to the optical fiber. Thus, the number of assembling steps was increased to thereby lead to a large increase in cost. Similarly, a large number of members for adjusting and fixing were required to thereby increase the number of components, which led to the large increase in the cost. Also, the conventional optical transceiver required a substrate made of silicon that had a V-groove to support the optical fiber, components using expensive materials such as a lens made of glass and the like, and complex processes to make those components. Hence, the cost of the components and the processing cost were increased to thereby lead to the large increase in the total cost.

Also, in order to carry out the single-wire two-way communication, an optical isolator was required to reduce the influence of crosstalk of lights on the transmitting side and the receiving side. This led to increase the number of the components and increase the cost of the components. Also, the beam splitter that was the optical component for separating the optical path was very expensive, so that this also led to the increase in the total cost of the optical transceiver.

Moreover, when the light emitting element and the light receiving element were mounted, very high precisions were required to the mounting positions of both the elements. Thus, in order to minimize their errors, the number of the assembling steps, especially, the number of the steps necessary for the adjustment was increased to thereby lead to the large increase in the cost.

The present invention is accomplished in order to solve the above mentioned problems. Accordingly, there has been a need to provide an optical transceiver that has a simple structure and a low cost, and attains a single-wire two-way communication.

SUMMARY OF THE INVENTION

In order to solve the above-mentioned problems, an optical transceiver according to the present invention is an optical transceiver, which includes a light emitting element for converting an electric signal into an optical signal and a light receiving element for converting an optical signal into an electric signal and carries out the single-wire two-way communication by using an optical fiber, and includes: an optical integrated chip in which the light emitting element and the light receiving element are formed on the same chip, and a light emitting section of the light emitting element and a light receiving section of the light receiving element are closely placed; and a circuit board where a via hole into which the optical fiber is inserted is penetrated and made, wherein at a position at which the light emitting section and the light receiving section are fitted into the via hole, the optical integrated chip is installed on one surface of the circuit board, and from the other surface of the circuit board, the optical fiber is inserted into and fixed to the via hole.

In the optical transceiver according to the present invention, the light emitting section and the light receiving section of the optical integrated chip are opposite on the end surface of the optical fiber which is inserted into and fixed to the via hole. Consequently, a transmitting light emitted from the light emitting section is inputted to the optical fiber, and a receiving light from the optical fiber is inputted to the light receiving section. Thus, the single-wire two-way communication can be attained in the simple structure.

Also, an optical transceiver according to the present invention is an optical transceiver, which includes a light emitting element for converting an electric signal into an optical signal and a light receiving element for converting an optical signal into an electric signal and carries out a single-wire two-way communication by using an optical fiber, includes: an optical integrated chip in which the light emitting element and the light receiving element are formed on the same chip, and a light emitting section of the light emitting element and a light receiving section of the light receiving element are closely placed; a circuit board where a via hole into which the optical fiber is inserted is penetrated and made; and an optical component for separating an optical path from the light emitting section and an optical path to the light receiving section, wherein at a position at which the light emitting section and the light receiving section are fitted into the via hole, the optical integrated chip is installed on one surface of the circuit board, and from the other surface of the circuit board, the optical fiber is inserted into and fixed to the via hole, and the optical component is placed inside the via hole between the optical integrated chip and the optical fiber, and a first waveguide through which a transmitting light is passed and a second waveguide through which a receiving light is passed are formed between the light emitting section and the light receiving section and an end surface of the optical fiber.

In the optical transceiver according to the present invention, on the end surface of the optical fiber that is inserted into and fixed to the via hole, the light emitting section of the optical integrated chip is opposite through the first waveguide, and the light receiving section is opposite through the second waveguide. Consequently, the transmitting light emitted from the light emitting section is passed through the first waveguide and inputted to the optical fiber, and the receiving light from the optical fiber is passed through the second waveguide and inputted to the light receiving section. Thus, it is possible to attain the single-wire two-way communication of full-duplex, in which the crosstalk is suppressed under the simple structure, since the transmitting light and the receiving light are separated.

DESCRIPTION OF THE PREFERRED EMBODIMENTS

Figure 1A:
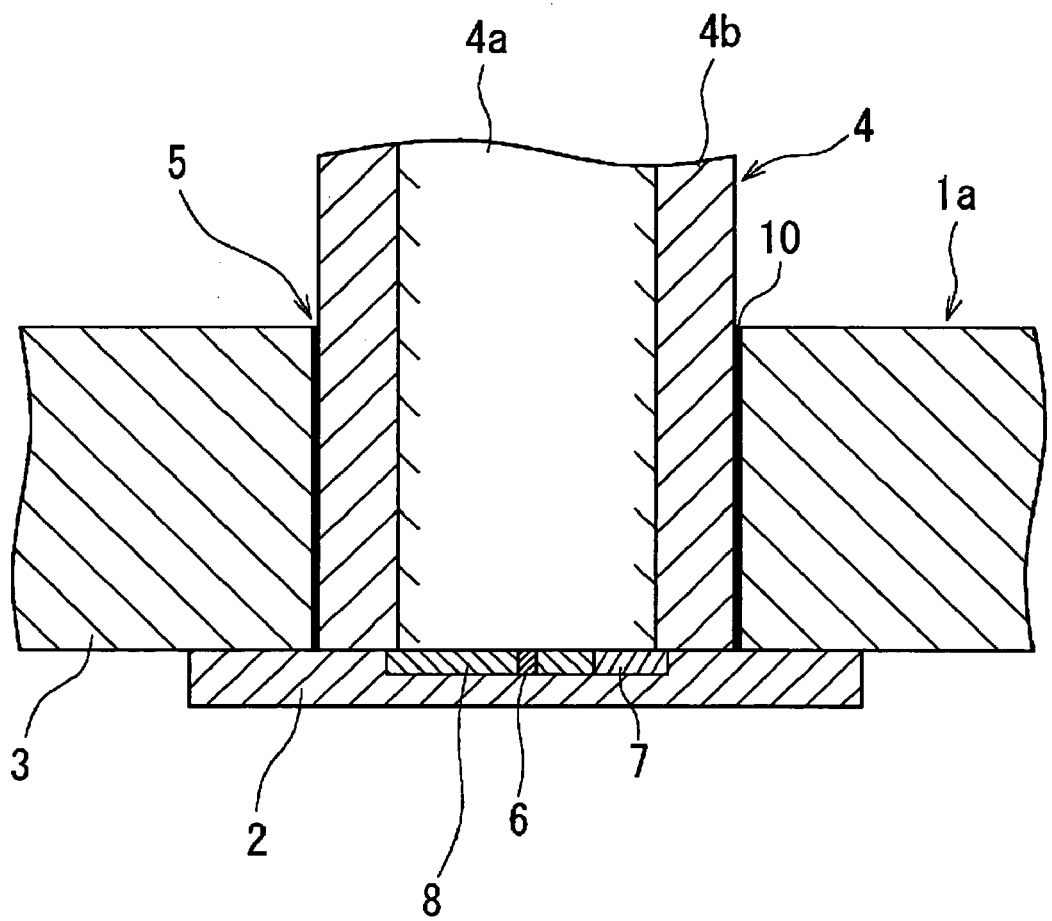
FIGS. 1A, 1B are explanation views showing a configuration example of an optical transceiver in a first embodiment of the present invention.
Figure 1B:
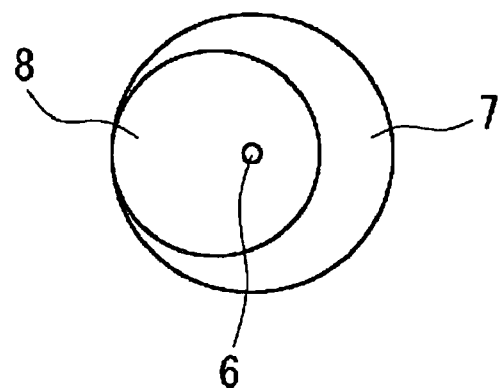
Figure 2:
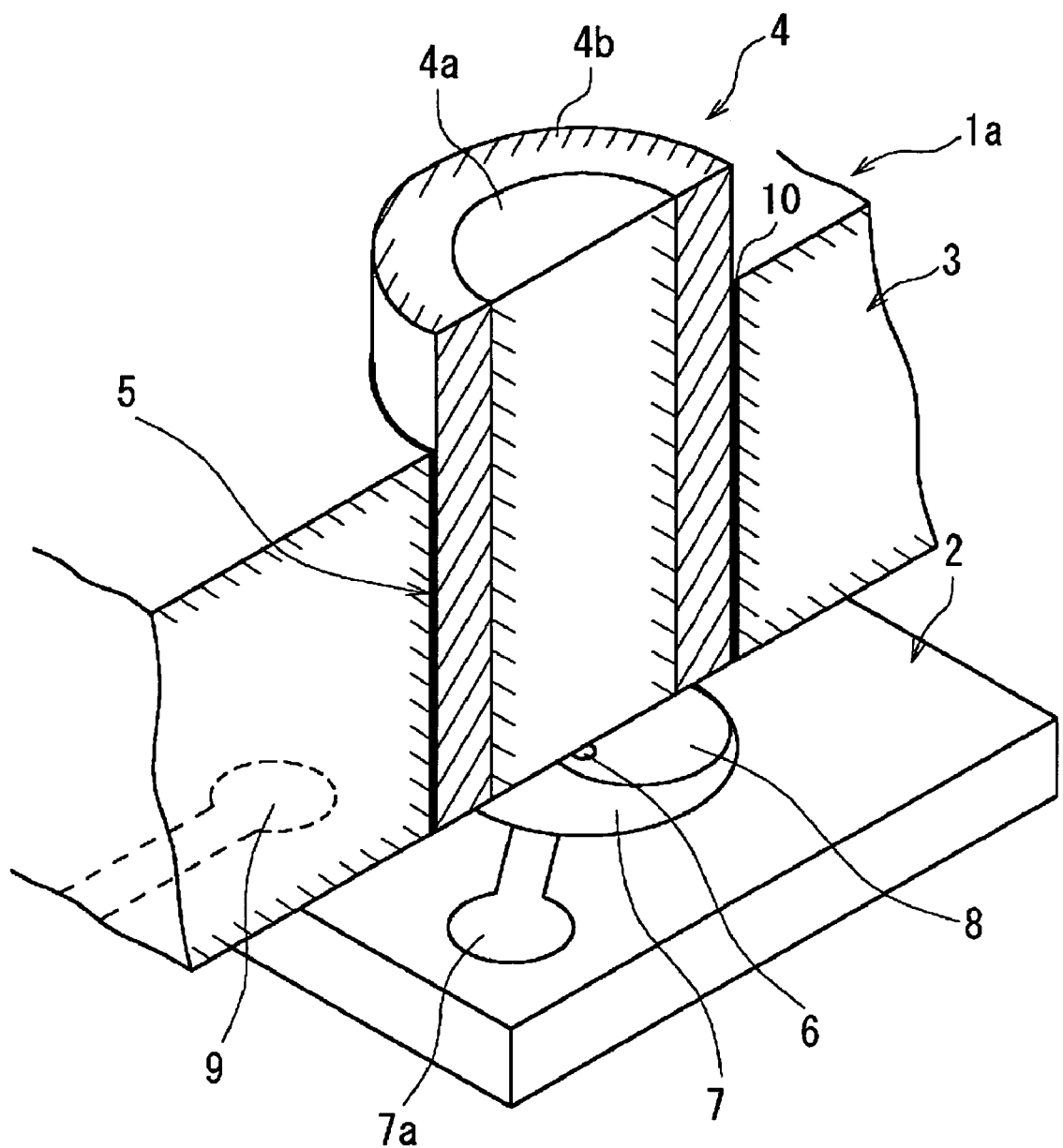
FIG. 2 is a partially broken perspective view showing the configuration example of the optical transceiver in the first embodiment.

Embodiments of an optical transceiver in the present invention will be described below with reference to the attached drawings. FIGS. 1A, 1B are explanation views showing a configuration example of an optical transceiver in a first embodiment. FIG. 1A is a side sectional view, and FIG. 1B is a plan view of a main portion thereof. Also, FIG. 2 is a partially broken perspective view showing the configuration example of the optical transceiver in the first embodiment.

An optical transceiver 1a in the first embodiment is designed such that an optical integrated chip 2, in which a light emitting element and a light receiving element are formed on the same chip, is mounted as flip-chip mounting on a circuit board 3, and an optical fiber 4 optically coupled with this optical integrated chip 2 is inserted into and fixed to a via hole 5 formed in the circuit board 3.

Figure 3:
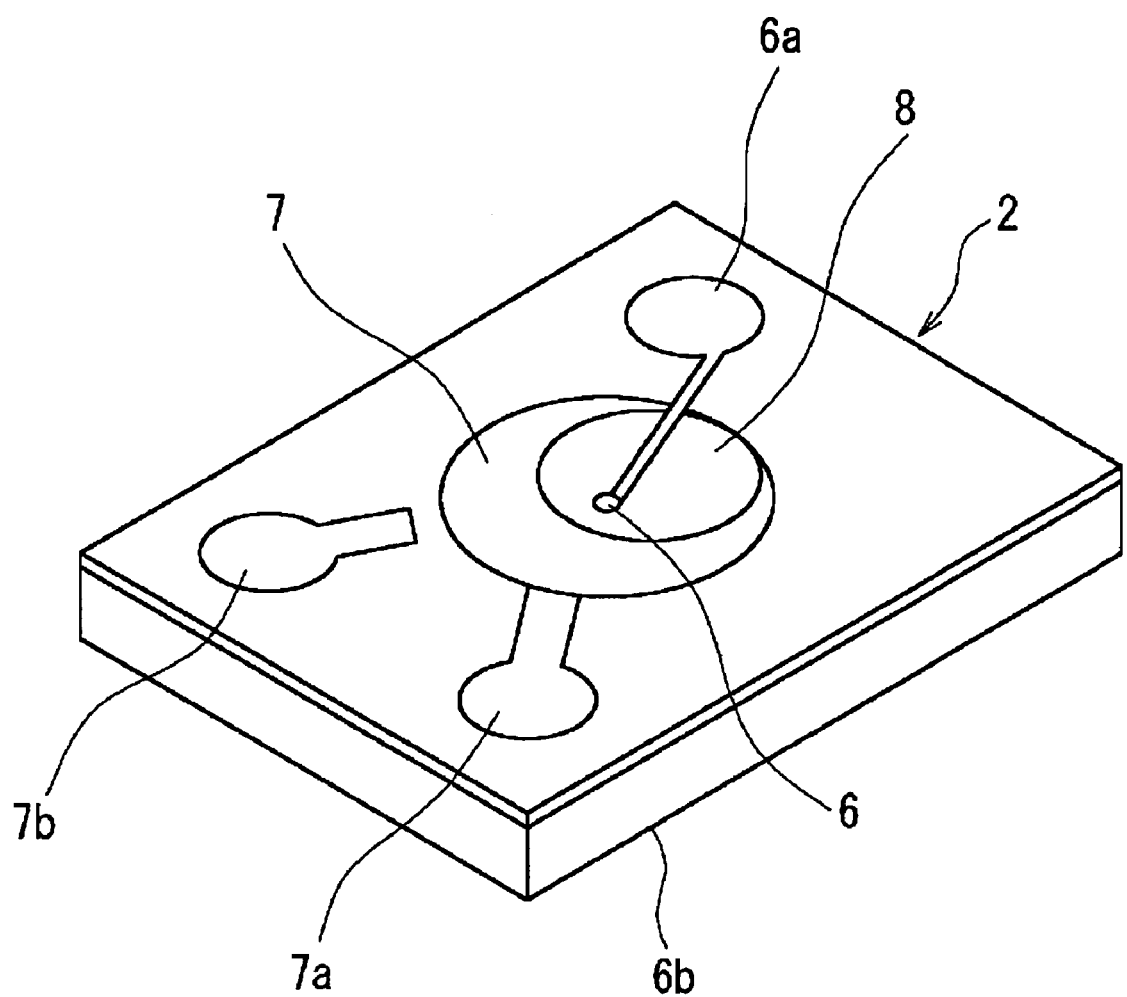
FIG. 3 is a perspective view showing a configuration example of an optical integrated chip of the present invention.

FIG. 3 is a perspective view showing the configuration example of the optical integrated chip 2. At first, the configuration of the optical integrated chip 2 is explained. In the optical integrated chip 2, the light emitting element and the light receiving element are formed on the same chip, and a light emitting section 6 and a light receiving section 7 are formed on the surface side of the optical integrated chip 2. The light emitting section 6 is VCSEL (Vertical Cavity Surface Emitting Lasers), namely a flat light emitting element, and the light receiving section 7 is formed around this light emitting section 6. The size of the optical integrated chip 2 is, for example, about 500×250 μm.

Here, the optical integrated chip 2 is manufactured by using a semiconductor manufacturing process. In an epitaxial growing method, a dead zone 8 is formed around the light emitting section 6. Since this dead zone 8 is formed at a position eccentric to the light emitting section 6, the light receiving section 7 is placed closely to the light emitting section 6. In this case, when the size of the light emitting section 6 is made, for example, to have a diameter of 10 μm, the dead zone 8 is sized to a diameter of about 100 μm, and the light receiving section 7 is sized to an inner diameter of 120 μm and an outer diameter of about 170 μm. Since the optical integrated chip 2 is formed in that way by using the semiconductor manufacturing process, the light emitting section 6 and the light receiving section 7 can be closely placed with a high positional precision. Also, since an existing semiconductor manufacturing facility can be used, the optical integrated chip 2 having a high precision can be manufactured at a low cost.

An anode electrode 7a and a cathode electrode 7b of the light receiving section 7 are formed on the surface of the optical integrated chip 2. Also, an anode electrode 6a of the light emitting section 6 is formed on the surface of the optical integrated chip 2. Moreover, a cathode electrode 6b of the light emitting section 6 is formed on a rear surface of the optical integrated chip 2. Incidentally, the arrangement of the respective electrodes in FIG. 3 is just one example. The cathode electrode 6b of the light emitting section 6 may be formed on the surface side of the chip 2.

The configuration of the circuit board 3 or the like on which this optical integrated chip 2 is mounted will be described below with reference to FIGS. 1A, 1B and FIG. 2. The circuit board 3 is a typical glass epoxy substrate. Electrode pads 9 for flip-chip mounting to be connected to the anode electrodes 6a, 7a and the cathode electrode 7b as illustrated in FIG. 3 are formed on the rear surface of this circuit board 3. Incidentally, FIG. 2 shows some of the electrode pads 9.

Also, circuit patterns other than the electrode pads 9 are formed on the circuit board 3. Moreover, a trans-impedance amplifier, a limiting amplifier, and an optical element driving IC on which they are integrated, a receiving IC, and other passive components are mounted thereon.

Then, the circuit board 3 has a function of converting an electric signal from external into a signal for driving the light emitting element, and then sending out to the optical integrated chip 2. The optical signal (receiving light) from external is converted into the electric signal by the light receiving element (not shown) of the optical integrated chip 2 and inputted to the circuit board 3. The circuit board 3 has a function of converting the electric signal of the receiving light into a signal to comply with a logic at a later stage.

The optical fiber 4 is composed of a core section 4a through which lights are guided, and a clad section 4b having a lower refractive index than that of this core section 4a. Since the periphery of the core section 4a is covered by this clad section 4b, the lights are confined in the core section 4a. Here, this embodiment uses a multi-mode fiber having a larger diameter of the core section 4a as the optical fiber 4. Then, the light emitting section 6 and the light receiving section 7 of the optical integrated chip 2 are placed at a distance at which a part of each section or the entire portion thereof is included in the diameter portion of the core section 4a of the optical fiber 4.

The via hole 5 is made through the circuit board 3. This via hole 5 is formed, for example, by the laser beam machining. Here, a diameter of the via hole 5 is about 100 to 250 μm, depending on a diameter of the optical fiber 4 to be used. However, since the penetration hole is made through the circuit board 3 by the laser beam machining, the via hole 5 is set such that the clearance to the optical fiber 4 has a diameter of about ±20 to 30 μm (10 to 15 μm at a radius). In this way, since the laser beam machining is used to form the penetration hole in the circuit board 3, it is possible to form the via hole 5 having the high dimensional precision with respect to the diameter of the optical fiber 4.

On the rear surface of the circuit board 3, the electrode pads 9 are arranged at predetermined positions around the via hole 5. Consequently, when the optical integrated chip 2 is placed on the circuit board 3, and when the optical fiber 4 is inserted into the via hole 5, the positional adjustment of the optical fiber 4 to the light emitting section 6 and the light receiving section 7 of the optical integrated chip 2 is carried out.

Figure 4A:
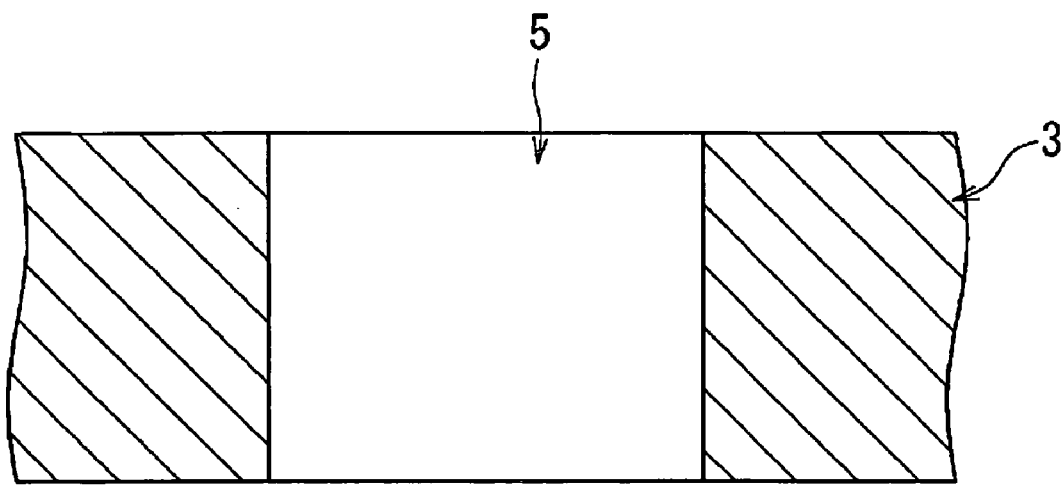
FIGS. 4A, 4B are explanation views showing an example of a mounting step of the optical integrated chip in the optical transceiver in the first embodiment.
Figure 4A:
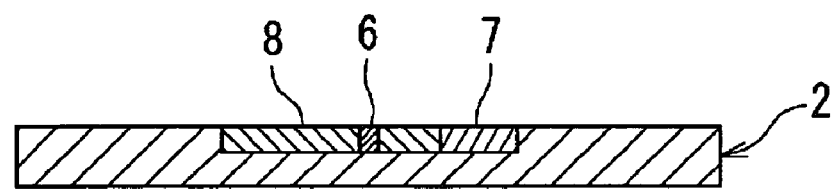
Figure 4B:
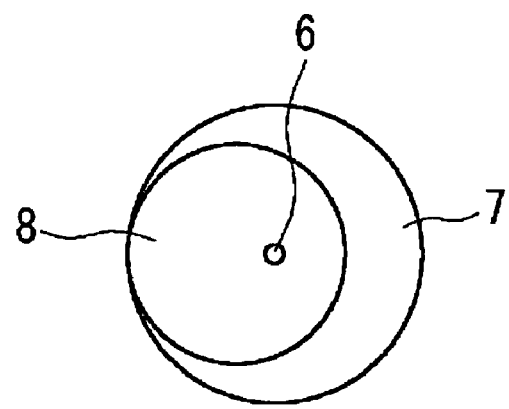
Figure 5:
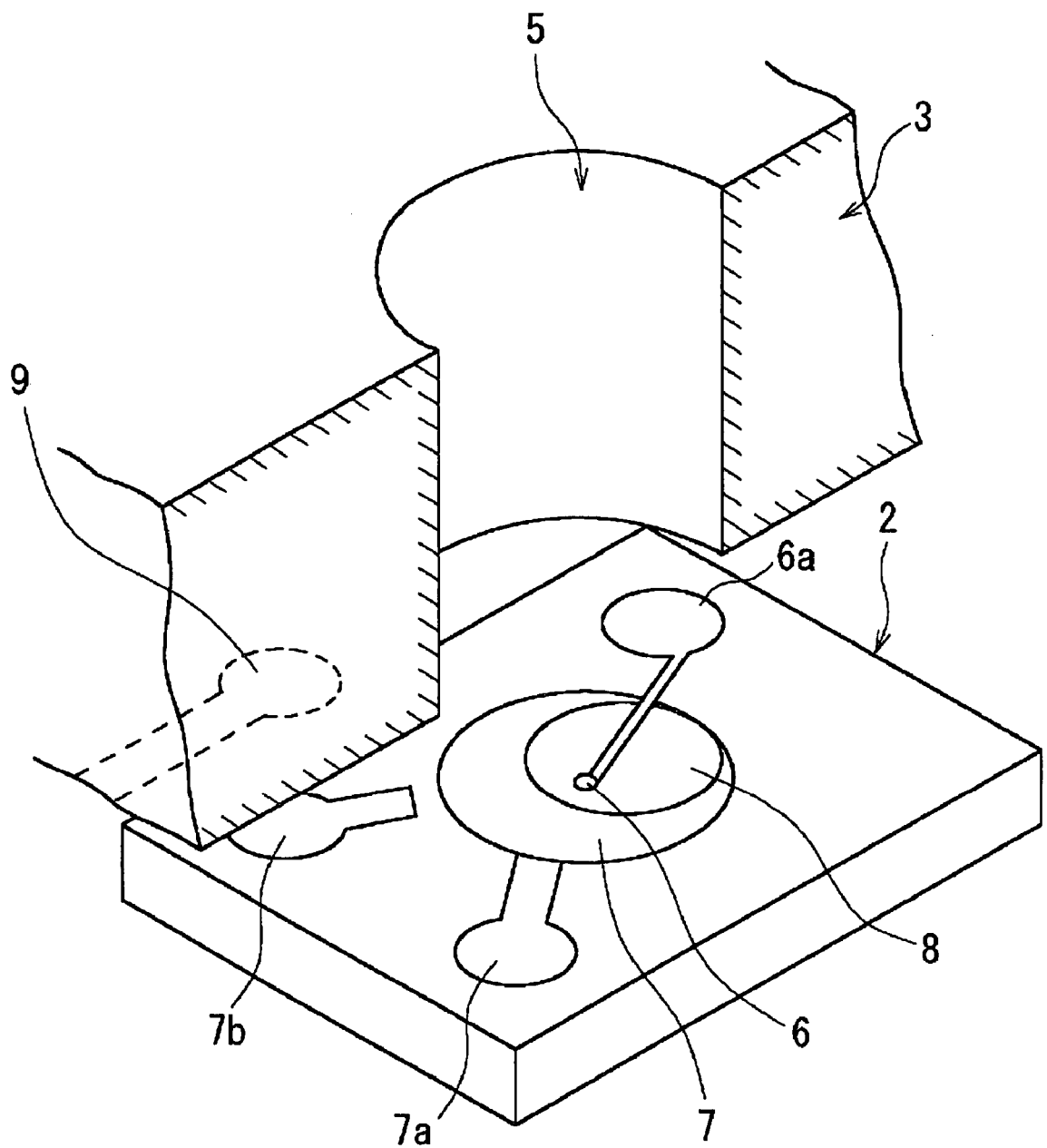
FIG. 5 is a partially broken perspective view showing the example of the mounting step of the optical integrated chip in the optical transceiver in the first embodiment.

The assembling step of the optical transceiver 1a in the first embodiment will be described below. FIGS. 4A, 4B are explanation views showing an example of mounting steps for the optical integrated chip 2 of the optical transceiver 1a in the first embodiment. FIG. 4A is a side sectional view, and FIG. 4B is a plan view of a main portion thereof. Also, FIG. 5 is a partially broken perspective view showing the example of the mounting step for the optical integrated chip 2 of the optical transceiver 1a in the first embodiment.

At first, the optical integrated chip 2 is mounted as flip-chip mounting on the circuit board 3 in which the via hole 5 is formed in advance. At this time, the surface of the circuit board 3, the via hole 5 and the optical integrated chip 2 are imaged by a CCD (Charge Coupled Device) camera, and an image recognition is performed to carry out the positional adjustment of the optical integrated chip 2. Then, since the respective electrodes of the optical integrated chip 2 are mounted as the flip-chip mounting on the electrode pads 9 of the circuit board 3, the optical integrated chip 2 is fixed to the circuit board 3 at the position where the light emitting section 6 is in coincidence with the center of the via hole 5.

Figure 6A:
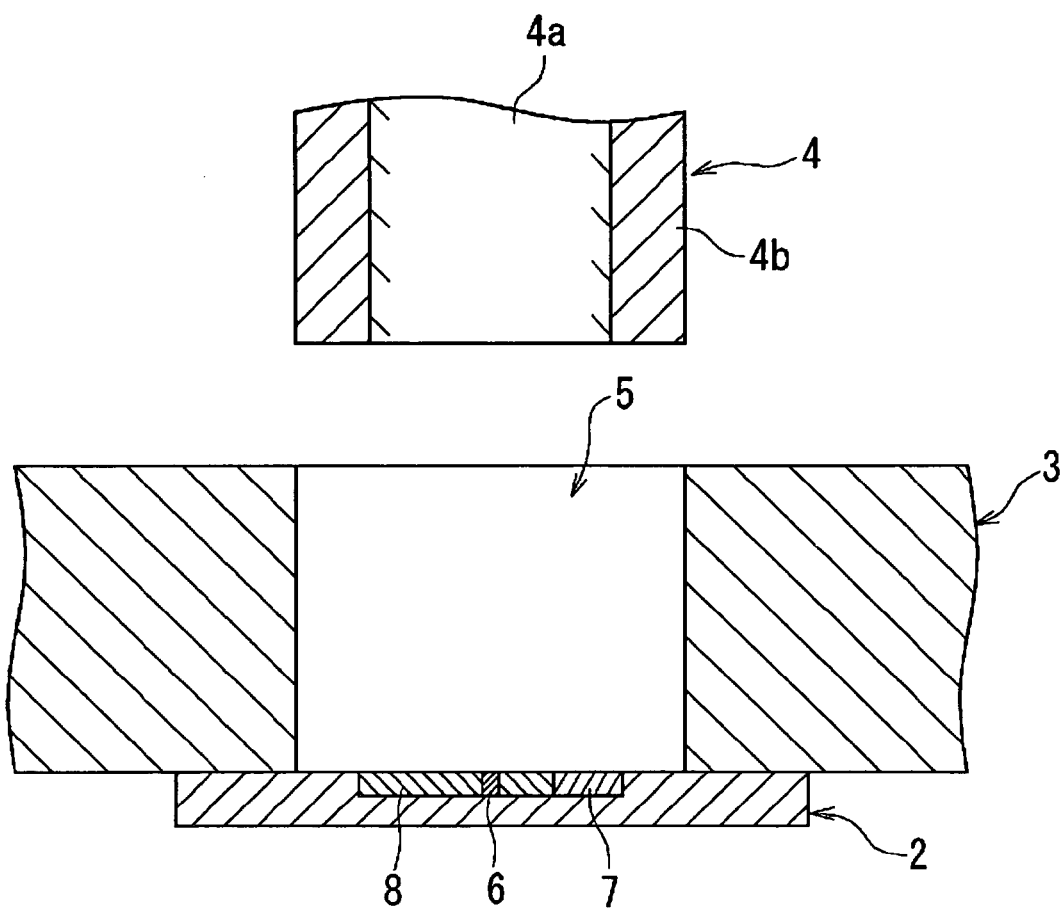
FIGS. 6A, 6B are explanation views showing an example of a mounting step of an optical fiber in the optical transceiver in the first embodiment.
Figure 6B:
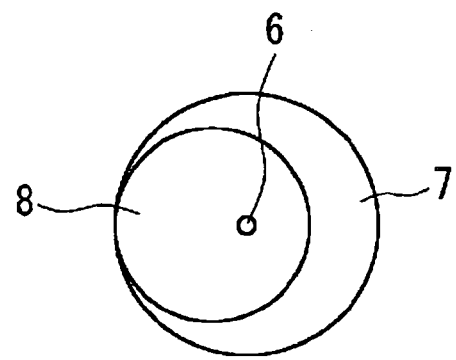
Figure 7:
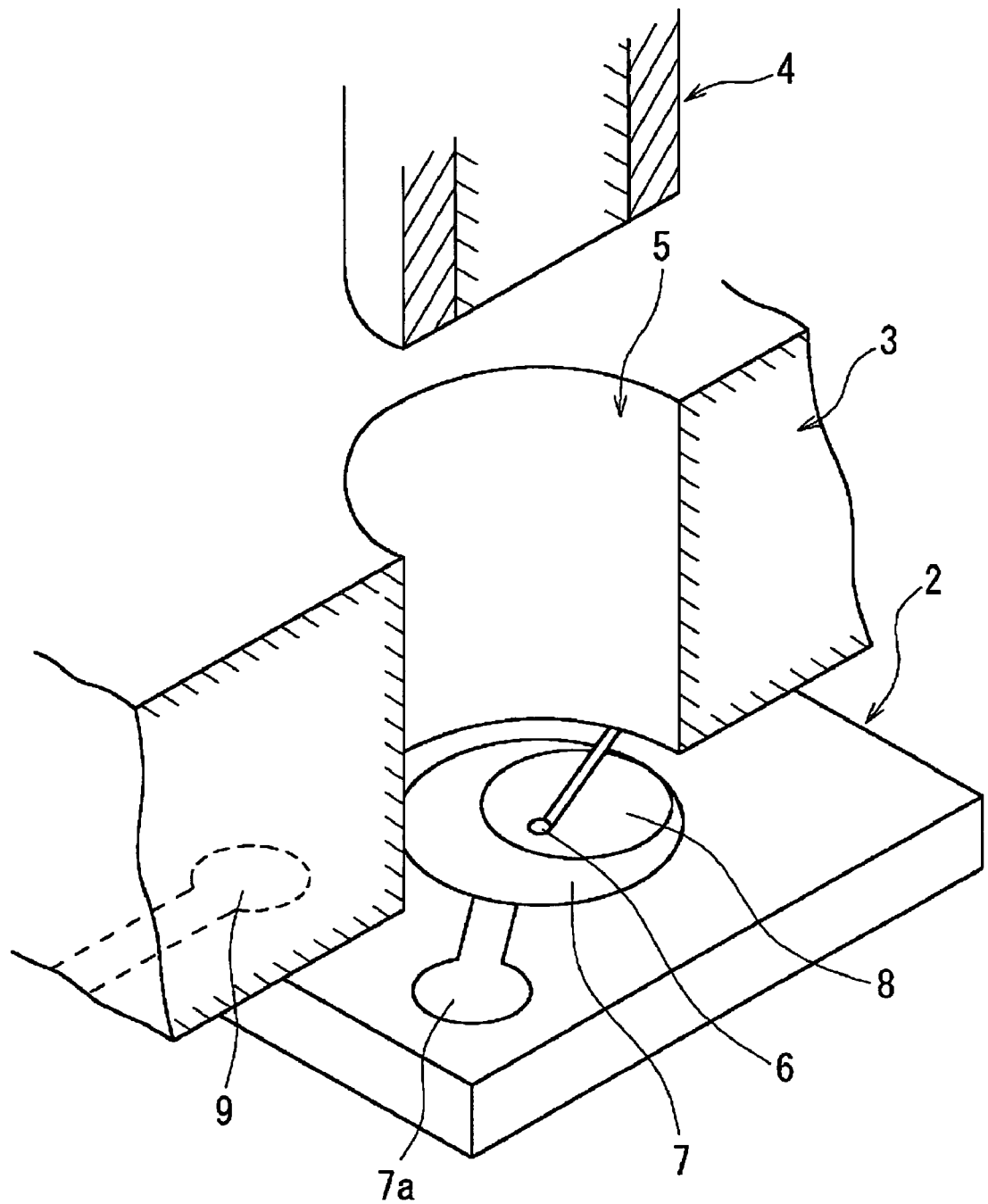
FIG. 7 is a partially broken perspective view showing the example of the mounting step of the optical fiber in the optical transceiver in the first embodiment.

FIGS. 6A, 6B are explanation views showing an example of the mounting step for the optical fiber 4 of the optical transceiver 1a in the first embodiment. FIG. 6A is a side sectional view, and FIG. 6B is a plan view of a main portion thereof. Also, FIG. 7 is a partially broken perspective view showing the example of the mounting step for the optical fiber 4 of the optical transceiver 1a in the first embodiment.

After the optical integrated chip 2 is mounted as the flip-chip mounting on the circuit board 3, the optical fiber 4 is inserted into the via hole 5 of the circuit board 3, from the surface side opposite to the optical integrated chip 2. Here, the optical fiber 4 is inserted to the position where its end surface is brought into contact with the surface of the optical integrated chip 2. Then, the optical fiber 4 is fixed to the circuit board 3 by using a resin 10 and the like as an adhesive.

As mentioned above, the via hole 5 of the circuit board 3 is formed with considerably high precision so that the clearance to the optical fiber 4 has about ±20 to 30 μm in a diameter. For this reason, only the insertion of the optical fiber 4 enables the via hole 5 to have a function of aligning a center of the core section 4a of the optical fiber 4 with a center of the via hole 5. Also, when the optical fiber 4 is fixed with resin, the resin injected between an outer circumference of the optical fiber 4 and an inner circumference of the via hole 5 causes a uniform tension to be applied to the optical fiber 4 from peripheral. Thus, even the adhesion exhibits a function of aligning a position in a diametric direction of the optical fiber 4. Hence, when the optical fiber 4 is mounted, the adjustment of the optical fiber 4 need not be performed, and any component for positioning is not additionally required. Moreover, since the light emitting section 6 and the light receiving section 7 are integrally formed on the optical integrated chip 2, the adjustment is also unnecessary between each of the light receiving and emitting elements and the optical fiber 4.

Here, since the optically transparent resin is used as the resin 10, the adhesion can be carried out in the manner in which the resin 10 lies between the end surface of the optical fiber 4 and the surface of the optical integrated chip 2.

As mentioned above, since the optical integrated chip 2 and the optical fiber 4 are mounted on the circuit board 3, as shown in FIGS. 1A, 1B and FIG. 2, they are fixed in the condition that the center of the light emitting section 6 of the optical integrated chip 2, the center of the via hole 5, and the center of the core section 4a of the optical fiber 4 are approximately coincident.

Consequently, the electric signal inputted to the optical transceiver 1a from external is converted into an optical signal through the light emitting elements (not shown) of the optical integrated chip 2 and the IC or the like formed on the circuit board 3, and becomes the transmitting light to be outputted from the light emitting section 6. The transmitting light is inputted to the core section 4a of the optical fiber 4 and sent out to external of the optical transceiver 1a.

Also, the receiving light inputted through the optical fiber 4 from external is inputted to the light receiving section 7 of the optical integrated chip 2, and outputted as the electric signal through the circuit board 3. In this way, the optical transceiver 1a in the first embodiment attains a single-wire two-way communication of half-duplex. Here, the light emitting section 6 of the optical integrated chip 2 is mounted so as to be approximately coincident with the center of the core section 4a of the optical fiber 4. However, the eccentric arrangement of the dead zone 8 causes even the light receiving section 7 to be placed at the position near the center of the core section 4a of the optical fiber 4. Consequently, it is possible to use the light having the high intensity as the receiving light.

Figure 8A:
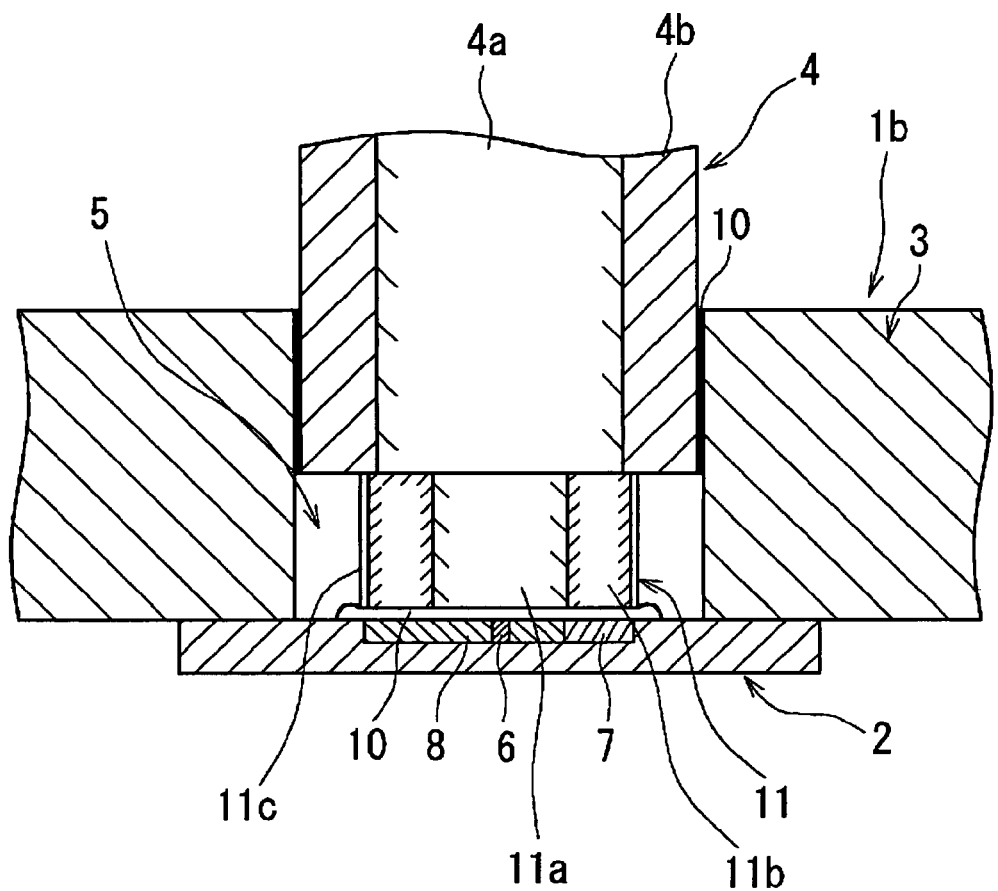
FIGS. 8A, 8B are explanation views showing a configuration example of an optical transceiver in a second embodiment of the present invention.
Figure 8B:
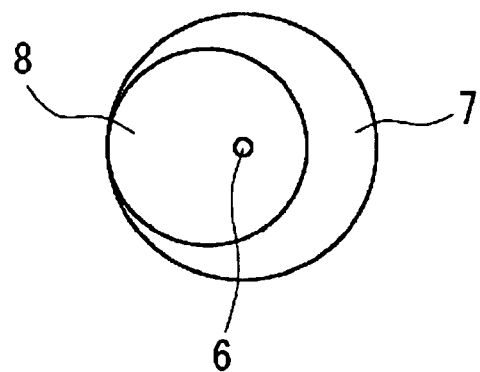
Figure 9:
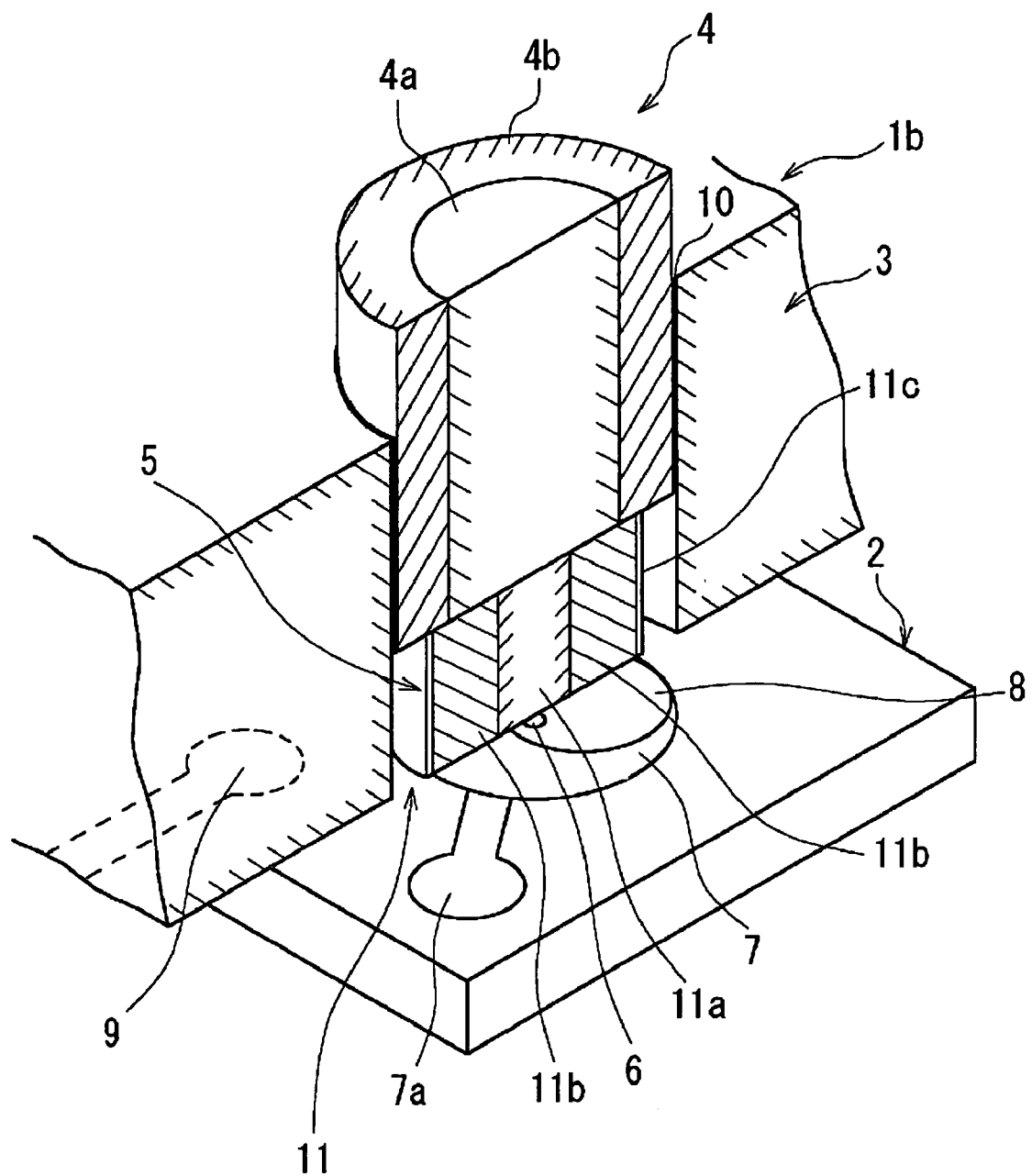
FIG. 9 is a partially broken perspective view showing the configuration example of the optical transceiver in the first embodiment.

Optical transceivers in second and third embodiments in which paths of the transmitting light and the receiving light can be separated to thereby carry out the single-wire two-way communication of full-duplex will be described below. FIGS. 8A, 8B are explanation views showing the configuration example of the optical transceiver in the second embodiment. FIG. 8A is a side sectional view, and FIG. 8B is a plan view of a main portion thereof. Also, FIG. 9 is a partially broken perspective view showing the configuration example of the optical transceiver in the second embodiment. By the way, the same numbers are given to the components having the same configuration as the optical transceiver 1a in the first embodiment in the explanation below.

An optical transceiver 1b in the second embodiment is designed such that an optical component 11 for separating the paths of the transmitting light and the receiving light is inserted between the optical fiber 4 and the optical integrated chip 2. The optical component 11 is designed such that, for example, metal plating is performed on an outer surface of a glass fiber having a two-layer structure, and a refractive index of an outer layer section is made different from that of an inner layer section. Consequently, the light is confined in the inner layer section, and this inner layer section forms a first waveguide 11a. Also, the outer layer section forms a second waveguide 11b. Thus, a total reflection film 11c is formed on the outer surface of the optical component 11 by the metal plating and the like, and the light is confined. Consequently, the optical component 11 is configured such that the light passed through the first waveguide 11a and the light passed through the second waveguide 11b are separated so as not to interfere with each other.

The configuration of the optical integrated chip 2 is as described in FIG. 3. This optical integrated chip 2 is configured such that the light emitting element and the light receiving element are formed on a single chip, and the light emitting section 6 and the light receiving section 7 are formed on the surface side of the optical integrated chip 2. The dead zone 8 formed around the light emitting section 6 is formed at the position eccentric to the light emitting section 6. Consequently, the light receiving section 7 is placed closely to the light emitting section 6.

The via hole 5 into which the optical fiber 4 is inserted is penetrated and formed in the circuit board 3. Also, on the rear surface of the circuit board 3, the electrode pads 9 connected to the anode electrode 6a and the like of the optical integrated chip 2 are placed at predetermined positions around the via hole 5.

Figure 10A:
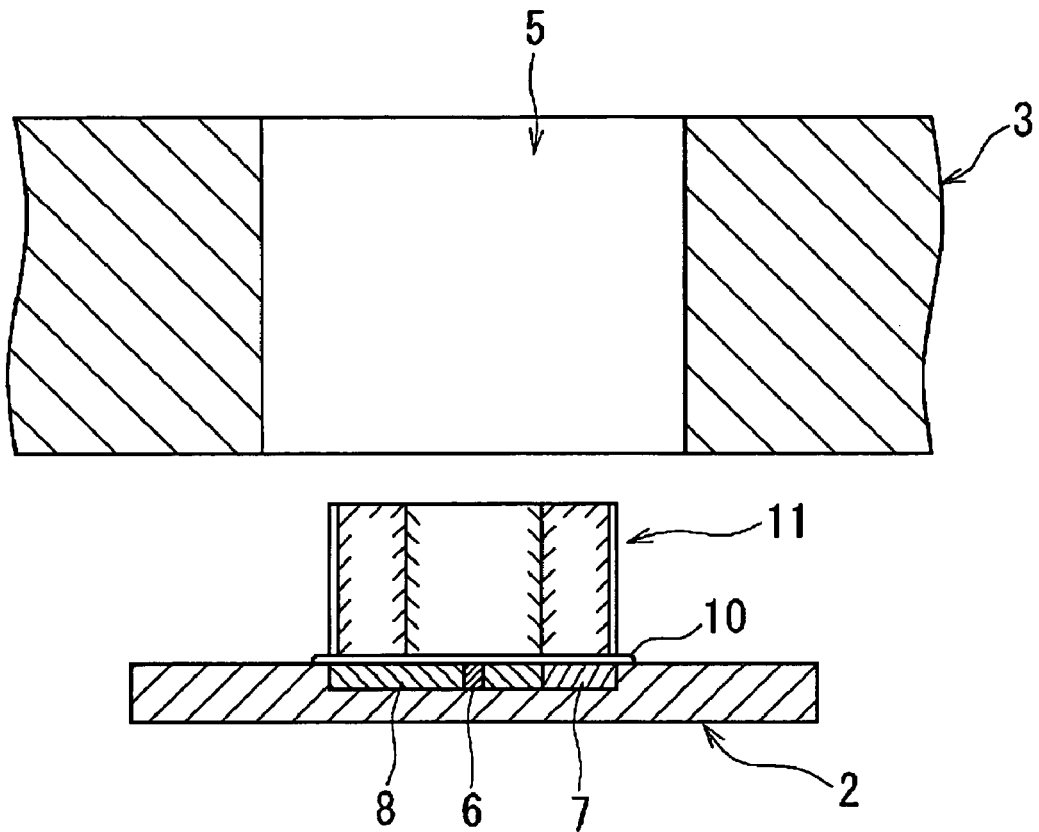
FIGS. 10A, 10B are explanation views showing an example of a mounting step of the optical integrated chip in the optical transceiver in the second embodiment.
Figure 10B:
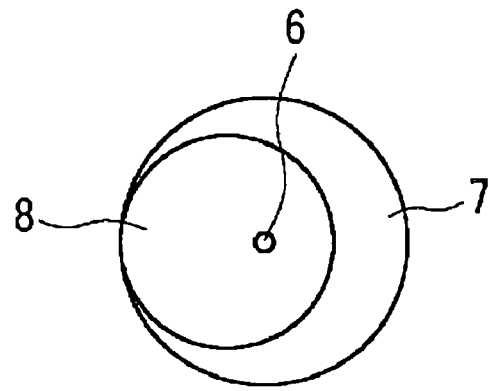
Figure 11:
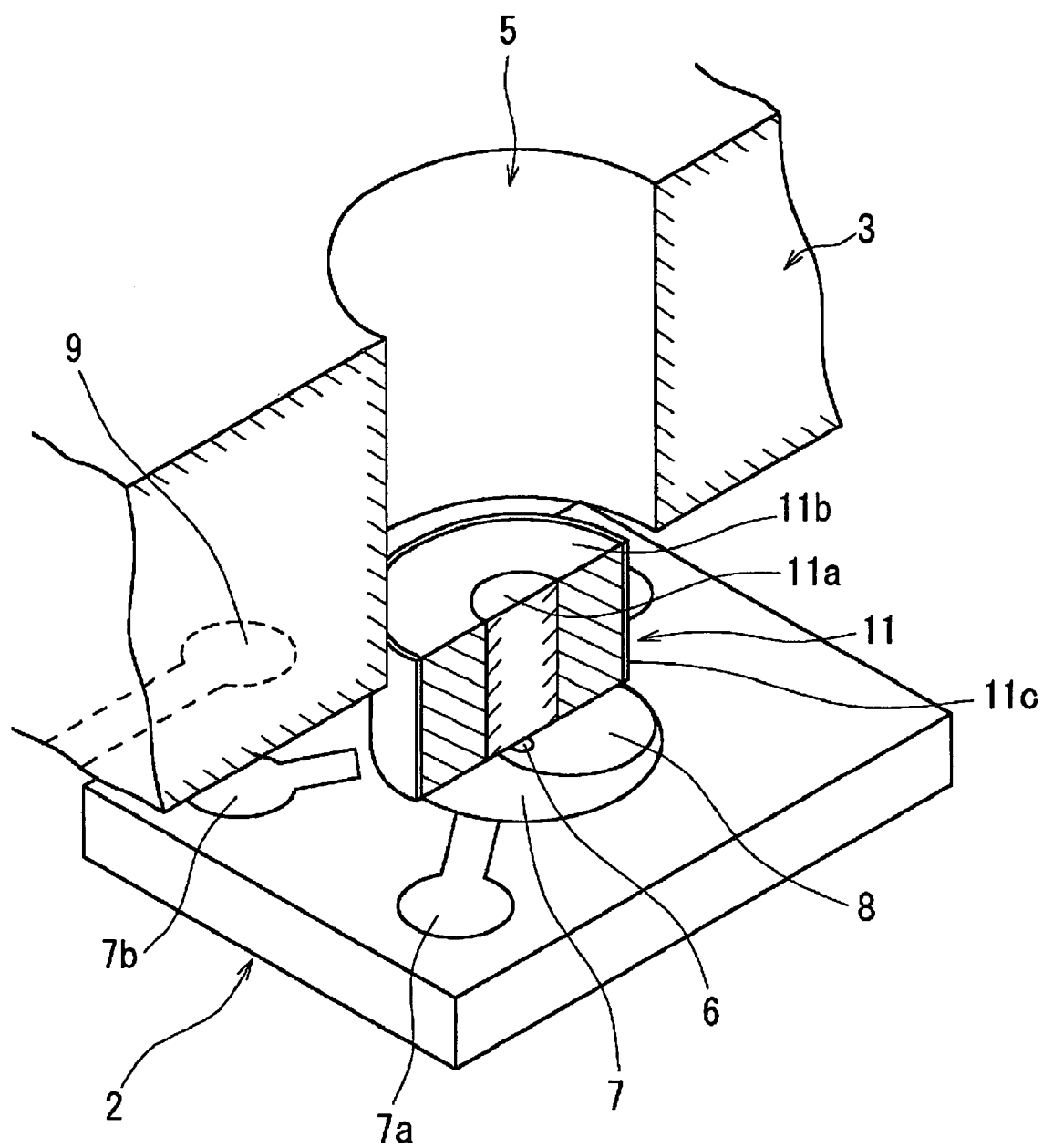
FIG. 11 is a partially broken perspective view showing the example of the mounting step of the optical integrated chip in the optical transceiver in the second embodiment.

The assembling step of the optical transceiver 1b in the second embodiment will be described below. FIGS. 10A, 10B are explanation views showing an example of the mounting step for the optical integrated chip 2 of the optical transceiver 1b in the second embodiment. FIG. 10A is a side sectional view, and FIG. 10B is a plan view of a main portion thereof. Also, FIG. 11 is a partially broken perspective view showing the example of the mounting step for the optical integrated chip 2 in the optical transceiver 1b in the second embodiment.

At first, in such a way that one end surface of the optical component 11 is hit against the surface of the optical integrated chip 2, the optical component 11 is adhered to the surface of the optical integrated chip 2 by using the optically transparent resin 10 as the adhesive. When the optical component 11 is mounted, the positional relation between the diametric direction of the optical component 11 and the optical integrated chip 2 is important. They are mounted such that the light, which is upwardly emitted from the light emitting section 6 of the optical integrated chip 2, is almost inputted to the first waveguide 11a of the optical component 11.

At this time, the diameter of the optical component 11 and the like are designed such that a second waveguide 11b is positioned above the light receiving section 7. Then, the light inputted through the second waveguide 11b from external is irradiated to the light receiving section 7 or the dead zone 8 of the optical integrated chip 2.

Next, the optical integrated chip 2 on which the optical component 11 is mounted is mounted as flip-chip mounting on the circuit board 3 in which the via hole 5 is formed in advance. At this time, the surface of the circuit board 3, the via hole 5, the optical integrated chip 2, and the optical component 11 are imaged by the CCD camera, and the image recognition is performed to carry out the positional adjustment of the optical integrated chip 2. Then, since the respective electrodes of the optical integrated chip 2 are mounted as flip-chip mounting on the electrode pads 9 of the circuit board 3, the optical integrated chip 2 is fixed to the circuit board 3 at the position where the light emitting section 6 is in coincidence with the center of the via hole 5. Incidentally, the diameter of the optical component 11 is smaller than the diameter of the via hole 5. So, this is designed such that the positional adjustment of the optical integrated chip 2 can be done under the condition that the optical component 11 is inserted into the via hole 5.

Figure 12A:
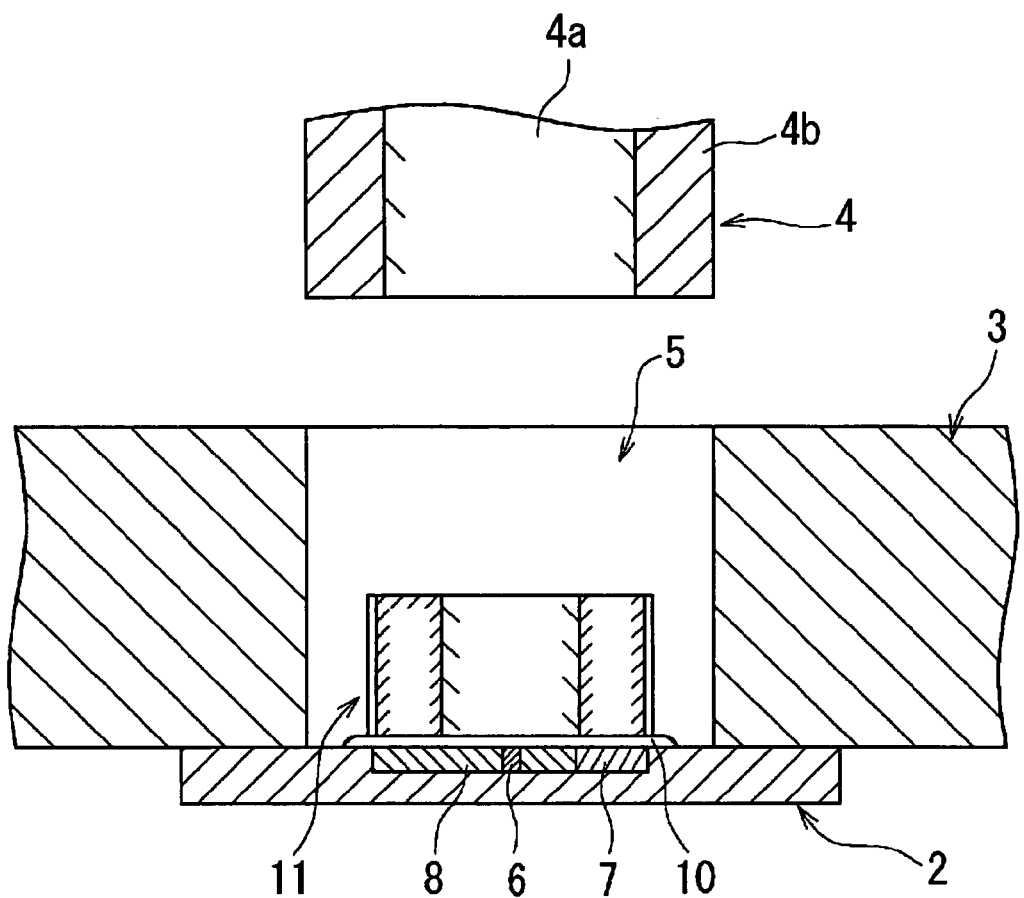
FIGS. 12A, 12B are explanation views showing an example of a mounting step of an optical fiber in the optical transceiver in the second embodiment.
Figure 12B:
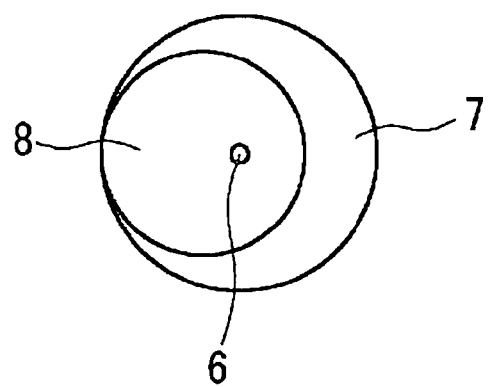
Figure 13:
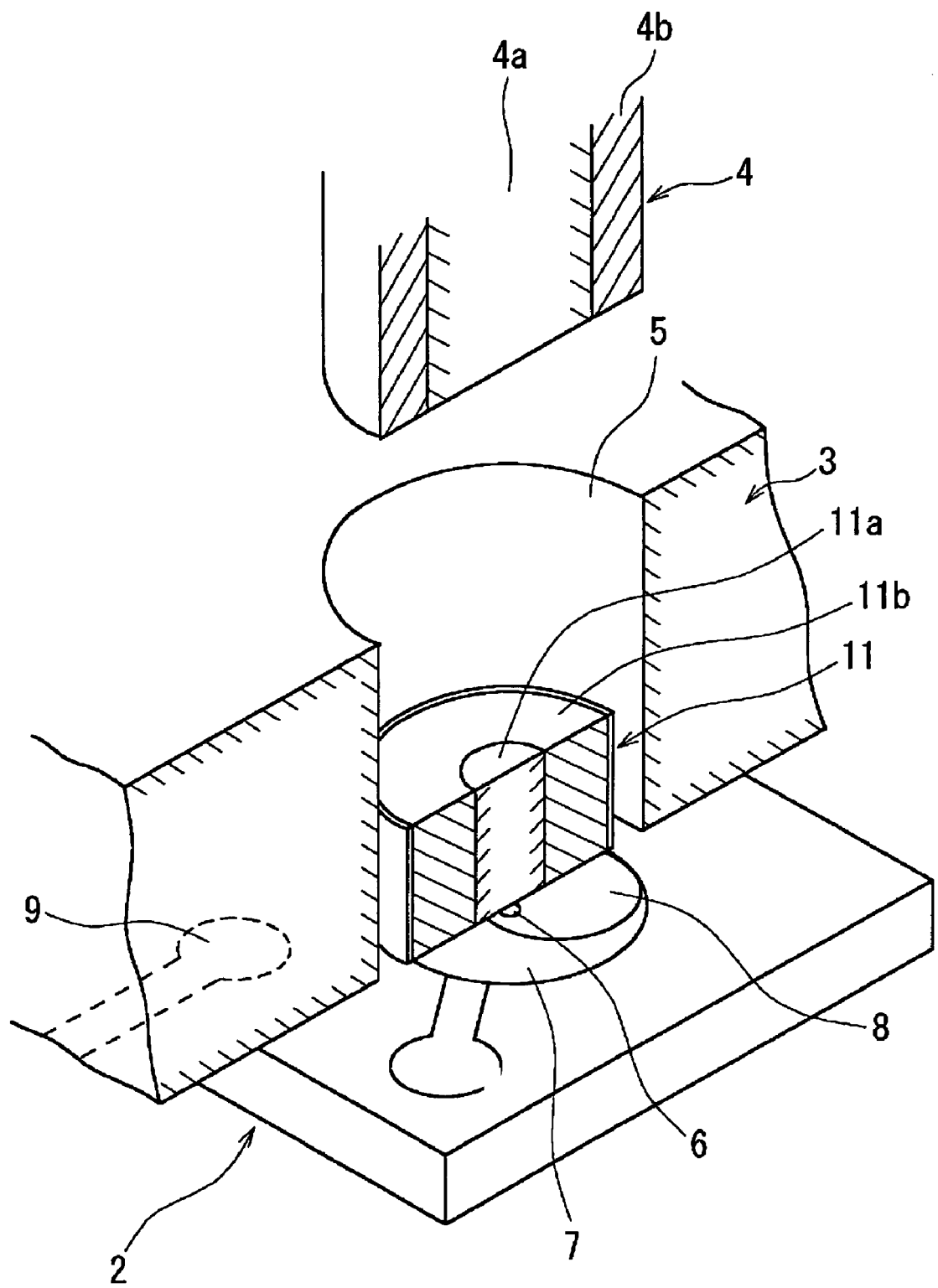
FIG. 13 is a partially broken perspective view showing the example of the mounting step of the optical fiber in the optical transceiver in the second embodiment.

FIGS. 12A, 12B are explanation views showing an example of the mounting step for the optical fiber 4 of the optical transceiver 1b in the second embodiment. FIG. 12A is a side sectional view, and FIG. 12B is a plan view of a main portion thereof. FIG. 13 is a partially broken perspective view showing the example of the mounting step for the optical fiber 4 of the optical transceiver 1b in the second embodiment.

After the optical integrated chip 2 on which the optical component 11 is mounted is mounted as flip-chip mounting on the circuit board 3, the optical fiber 4 is inserted into the via hole 5 of the circuit board 3, from the surface side opposite to the optical integrated chip 2. Here, the optical fiber 4 is inserted to the position where its end surface is brought into contact with the other end surface of the optical component 11. Then, the optical fiber 4 is fixed to the circuit board 3 by using the resin 10 as the adhesive.

As mentioned above, the via hole 5 of the circuit board 3 is formed with the considerably high precision so that the clearance to the optical fiber 4 has about ±20 to 30 μm in a diameter. For this reason, only the insertion of the optical fiber 4 enables the via hole 5 to have the function of aligning the center of the core section 4a of the optical fiber 4 with the center of the via hole 5. Also, when the optical fiber 4 is fixed with the resin, the resin injected between the outer circumference of the optical fiber 4 and the inner circumference of the via hole 5 causes the uniform tension to be applied to the optical fiber 4 from peripheral. Thus, even the adhesion exhibits the function of aligning the position in the diametric direction of the optical fiber 4.

As mentioned above, since the optical integrated chip 2 and the optical fiber 4 are mounted on the circuit board 3, as shown in FIGS. 8A, 8B and FIG. 9, they are fixed in the condition that the center of the light emitting section 6 of the optical integrated chip 2, the center of the first waveguide 11a of the optical component 11, the center of the via hole 5, and the center of the core section 4a of the optical fiber 4 are approximately coincident.

Consequently, the electric signal inputted to the optical transceiver 1b from external is converted into the optical signal through the light emitting elements (not shown) of the optical integrated chip 2 and the IC or the like formed on the circuit board 3, and becomes the transmitting light to be outputted from the light emitting section 6. The transmitting light is passed through the first waveguide 11a of the optical component 11, inputted to the core section 4a of the optical fiber 4 and sent out to external of the optical transceiver 1b.

Also, the receiving light inputted through the optical fiber 4 from external is inputted to both of the first waveguide 11a and the second waveguide 11b of the optical component 11. The light transmitted through the second waveguide 11b is inputted to the light receiving section 7 of the optical integrated chip 2 and outputted as the electric signal through the circuit board 3. Here, an area of the light emitting section 6 is sufficiently small as compared with a sectional area of the first waveguide 11a. Thus, among the receiving lights inputted to the first waveguide 11a and the second waveguide 11b, most of the lights transmitted through the first waveguide 11a drop onto the dead zone 8, and have no influence on the transmitting signal and the receiving signal. In this way, in the optical transceiver 1b in the second embodiment, the paths for the transmitting light and the receiving light are separated by the optical component 11 to thereby attain the single-wire two-way communication of the full-duplex.

Figure 14A:
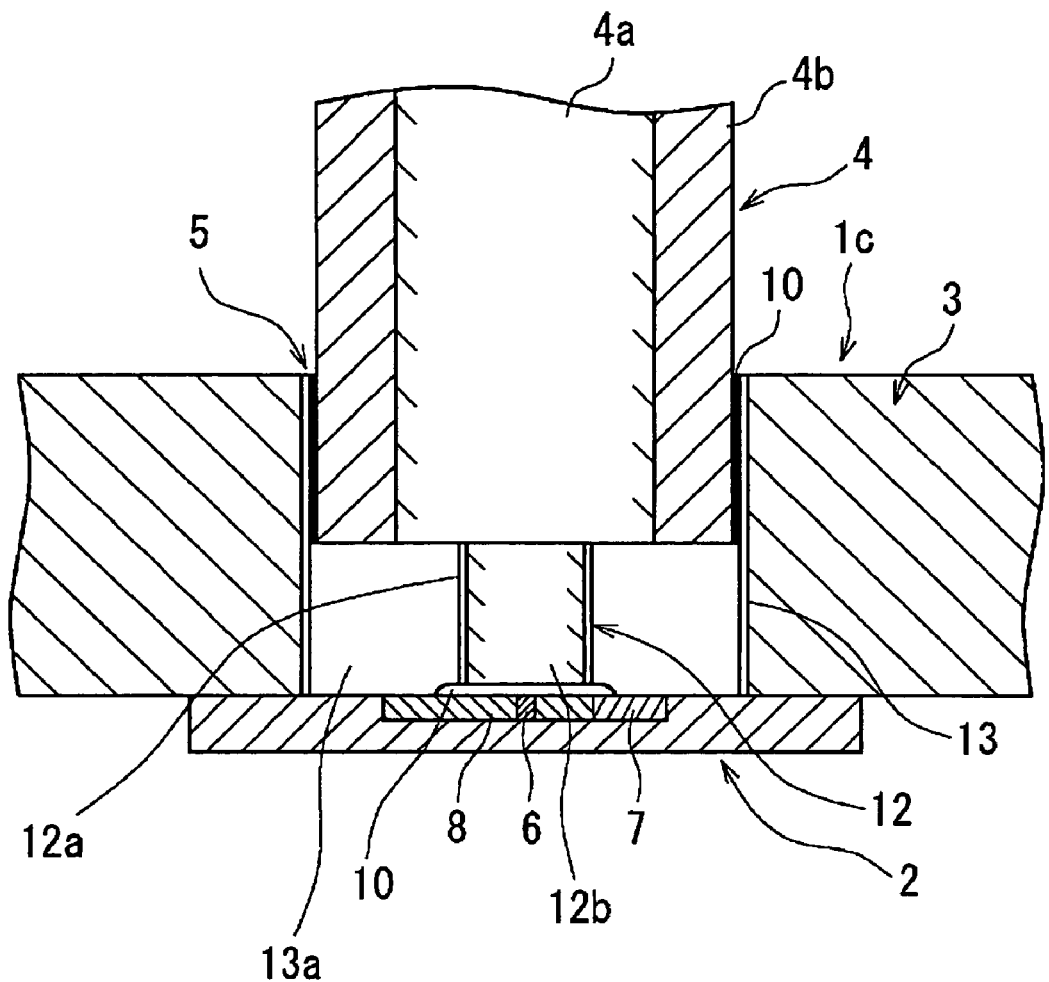
FIGS. 14A, 14B are explanation views showing a configuration example of an optical transceiver in a third embodiment of the present invention.
Figure 14B:
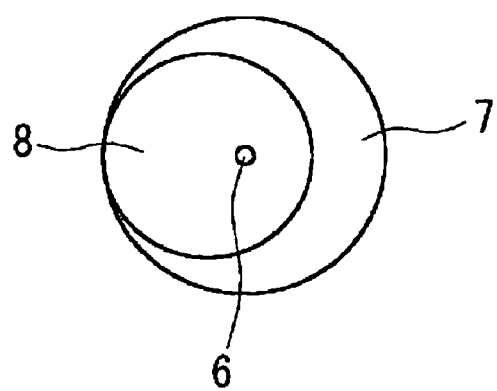
Figure 15:
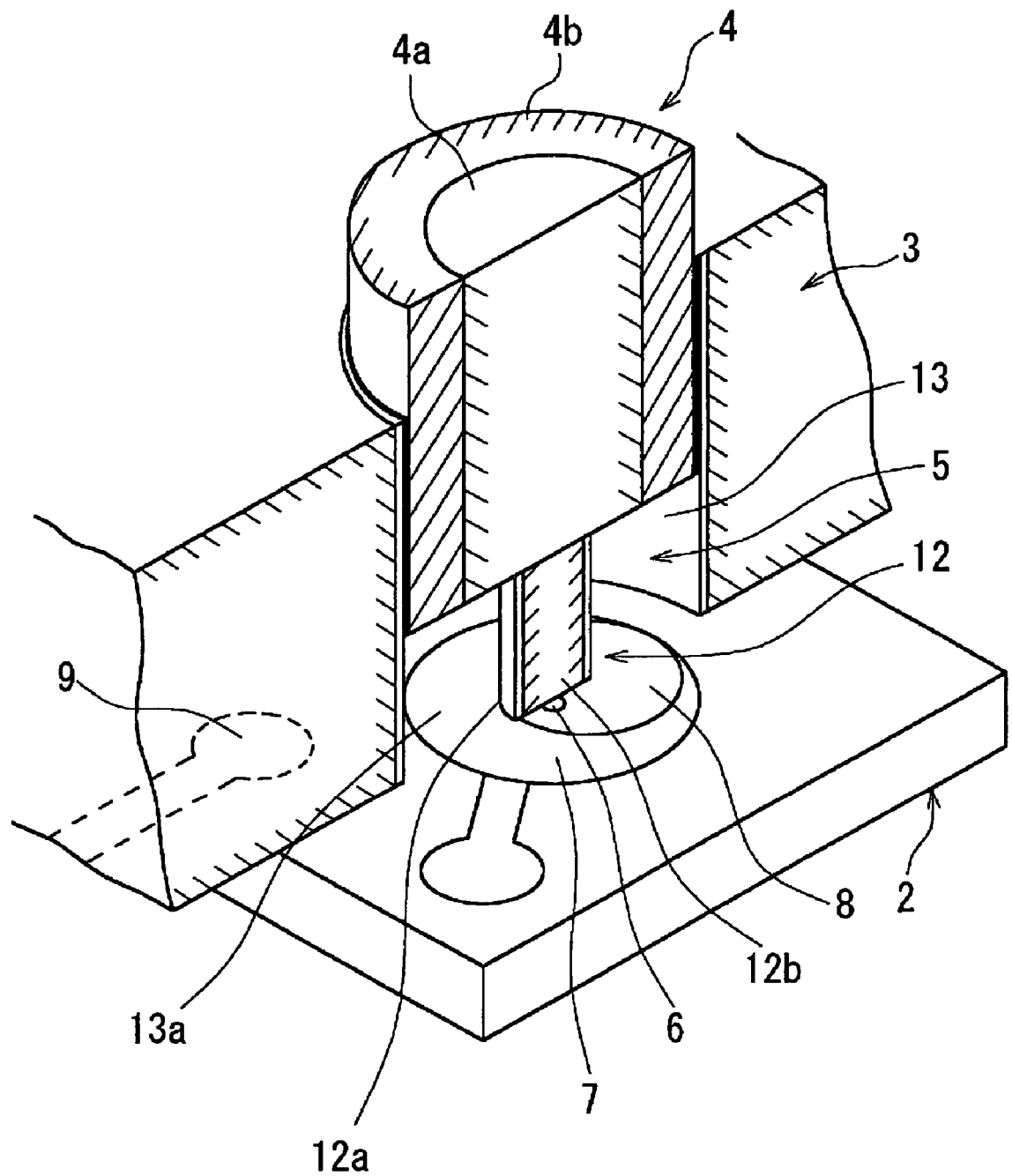
FIG. 15 is a partially broken perspective view showing the configuration example of the optical transceiver in the third embodiment.

FIGS. 14A, 14B are explanation views showing the configuration example of the optical transceiver in the third embodiment. FIG. 14A is a side sectional view, and FIG. 14B is a plan view of a main portion thereof. Also, FIG. 15 is a partially broken perspective view showing the configuration example of the optical transceiver in the third embodiment. By the way, the same number is given to the components having the same configuration as the optical transceiver 1a in the first embodiment in the explanations below.

An optical transceiver 1c in the third embodiment is designed such that an optical component 12 for separating the paths of the transmitting light and the receiving light is inserted between the optical fiber 4 and the optical integrated chip 2, and a total reflection film 13 is formed on the inner surface of the via hole 5. In the optical component 12, for example, a total reflection film 12a is formed around a glass tube by metal plating. Then, a first waveguide 12b in which the light is confined is formed on the inner surface of the total reflection film 12a.

The configuration of the optical integrated chip 2 is as described in FIG. 3. Also, the via hole 5 into which the optical fiber 4 is inserted is penetrated and formed in the circuit board 3. The total reflection film 13 is formed on the inner surface of this via hole 5, for example, by metal plating. A diameter of the optical component 12 is smaller than a diameter of the via hole 5. A gap through which the light is passed is formed between the outer surface of the optical component 12 and the inner surface of the via hole 5. Then, the total reflection film 13 on the inner surface of the via hole 5 and the total reflection film 12a on the outer surface of the optical component 12 constitute a second waveguide 13a in which the light is confined between the outer surface of the optical component 12 and the inner surface of the via hole 5.

Figure 16A:
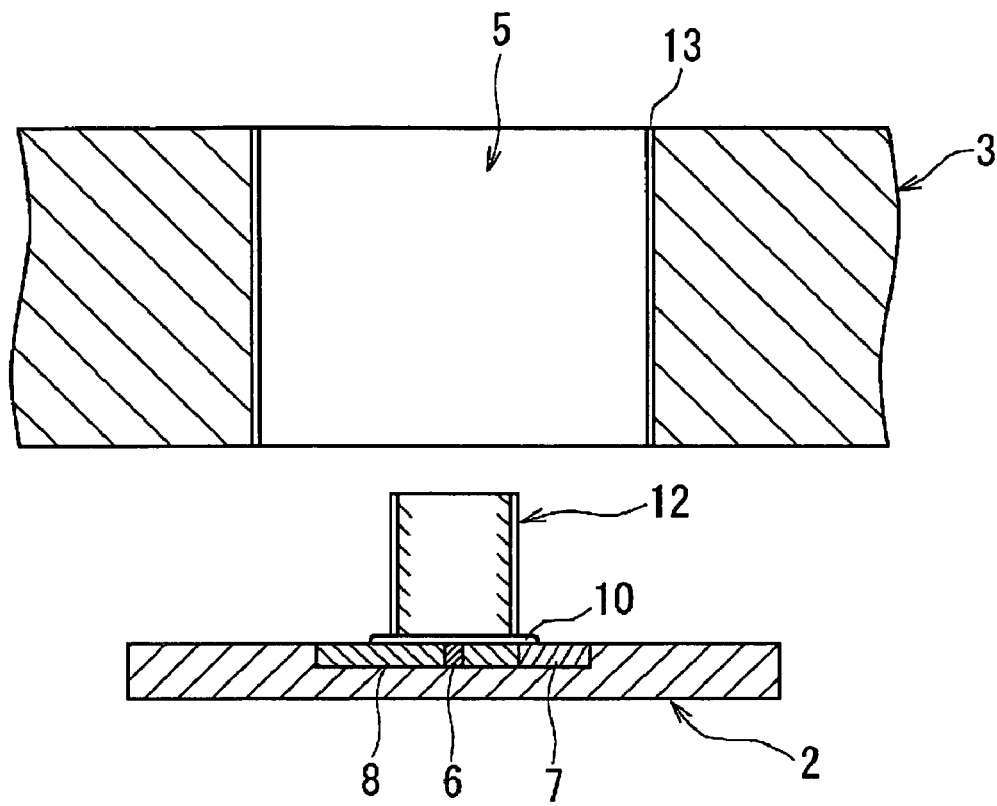
FIGS. 16A, 16B are explanation views showing an example of a mounting step of the optical integrated chip in the optical transceiver in the third embodiment.
Figure 16B:
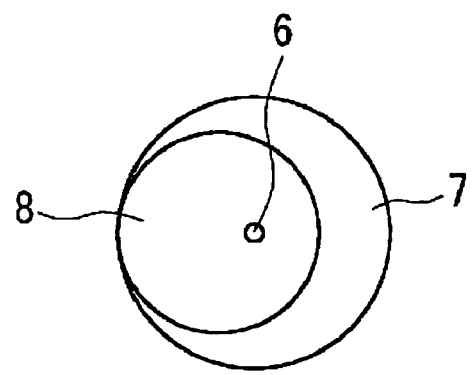
Figure 17:
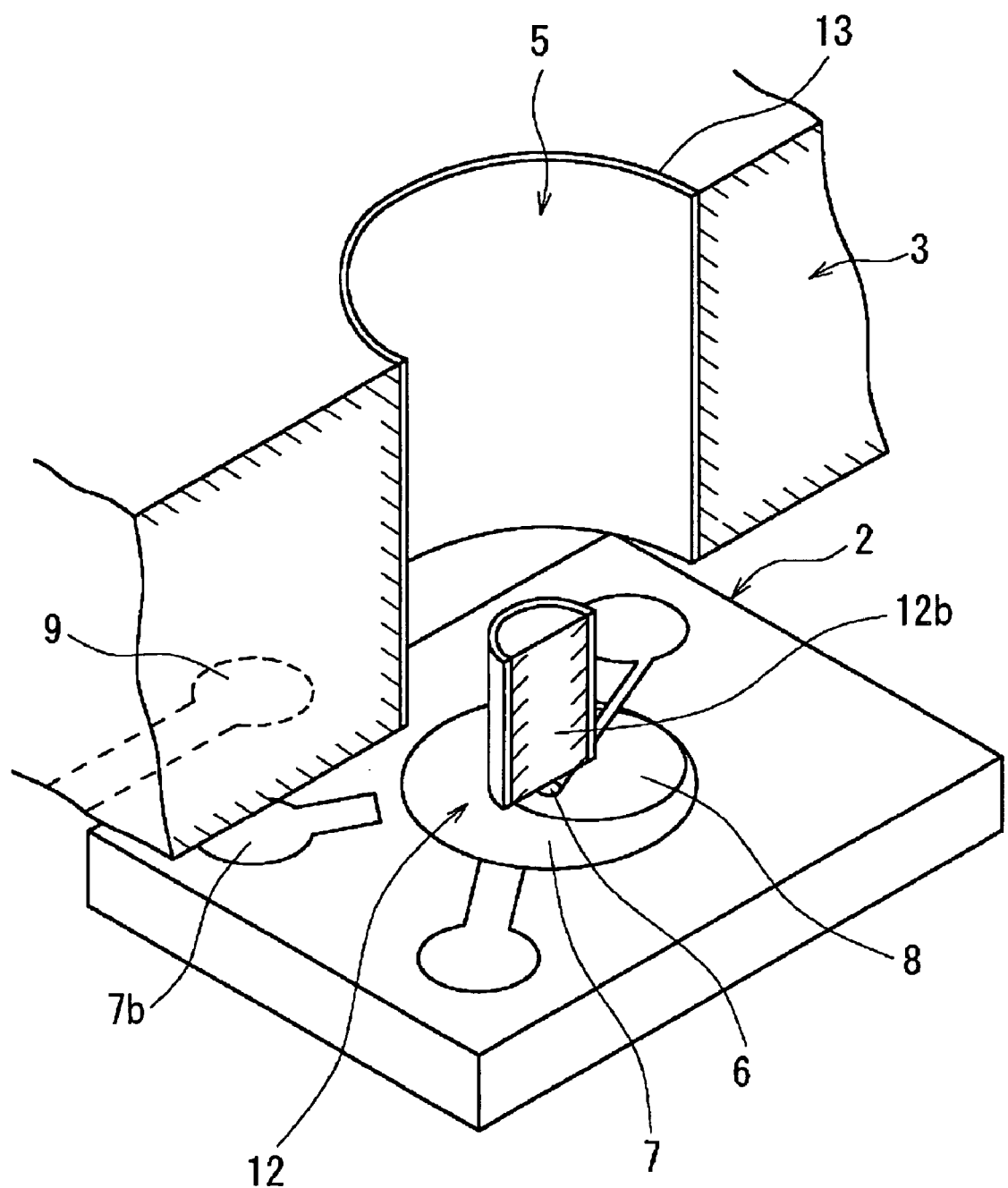
FIG. 17 is a partially broken perspective view showing the example of the mounting step of the optical integrated chip in the optical transceiver in the third embodiment.

The assembling step of the optical transceiver 1c in the third embodiment will be described below. FIGS. 16A, 16B are explanation views showing an example of the mounting step of the optical integrated chip 2 in the optical transceiver 1c in the third embodiment. FIG. 16A is a side sectional view, and FIG. 16B is a plan view of a main portion thereof. Also, FIG. 17 is a partially broken perspective view showing the example of the mounting step for the optical integrated chip 2 of the optical transceiver 1c in the third embodiment.

At first, in such a way that one end surface of the optical component 12 is hit against the surface of the optical integrated chip 2, the optical component 12 is adhered to the surface of the optical integrated chip 2 by using the optically transparent resin 10 as the adhesive. When the optical component 12 is mounted, the positional relation between the diametric direction of the optical component 12 and the optical integrated chip 2 is important. They are mounted such that the light, which is upwardly emitted from the light emitting section 6 of the optical integrated chip 2, is almost inputted to the first waveguide 12b of the optical component 12.

Next, the optical integrated chip 2 on which the optical component 12 is mounted is mounted as flip-chip mounting on the circuit board 3 where the via hole 5 is formed in advance and the total reflection film 13 is formed on the inner surface of this via hole 5. At this time, the surface of the circuit board 3, the via hole 5, the optical integrated chip 2, and the optical component 12 are imaged by the CCD camera, and the image recognition is performed to carry out the positional adjustment of the optical integrated chip 2. Then, since the respective electrodes of the optical integrated chip 2 are mounted as flip-chip mounting on the electrode pads 9 of the circuit board 3, the optical integrated chip 2 is fixed to the circuit board 3 at the position where the light emitting section 6 is in coincidence with the center of the via hole 5.

Figure 18A:
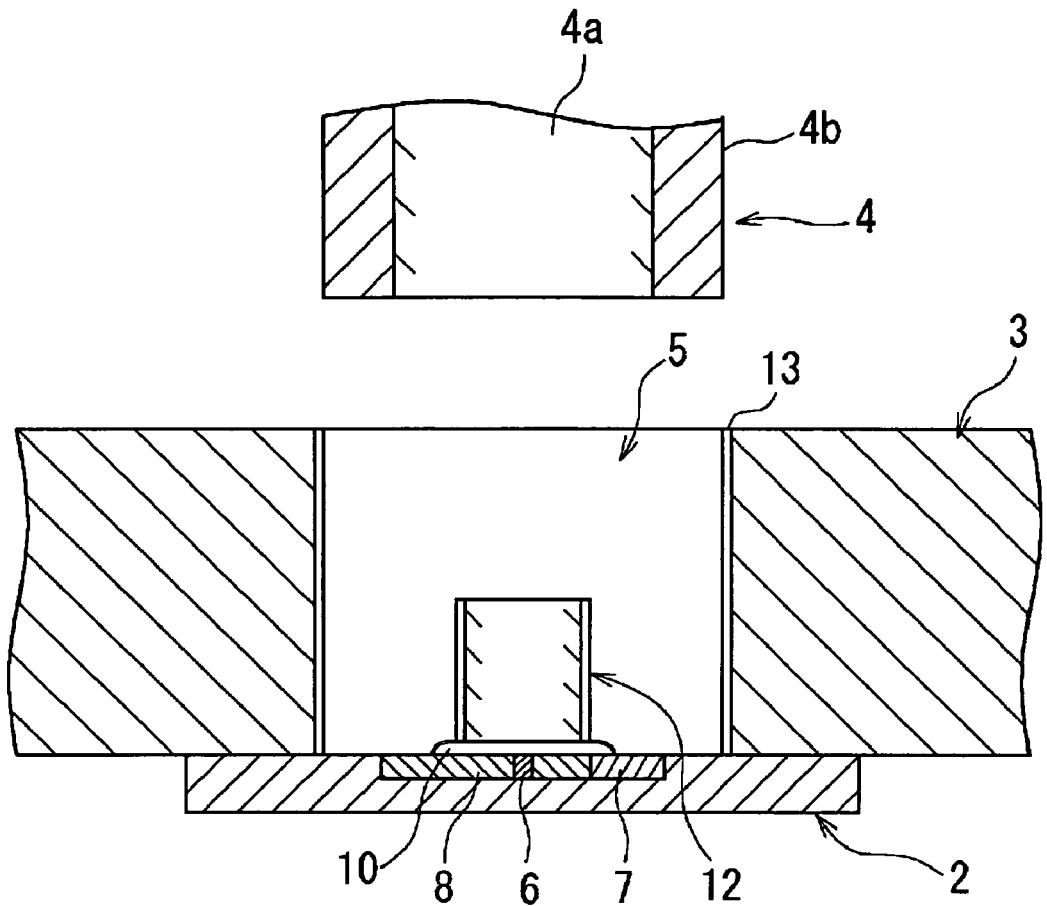
FIGS. 18A, 18b are explanation views showing an example of a mounting step of an optical fiber in the optical transceiver in the third embodiment.
Figure 18B:
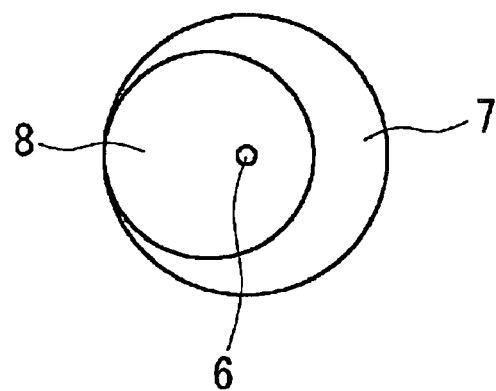
Figure 19:
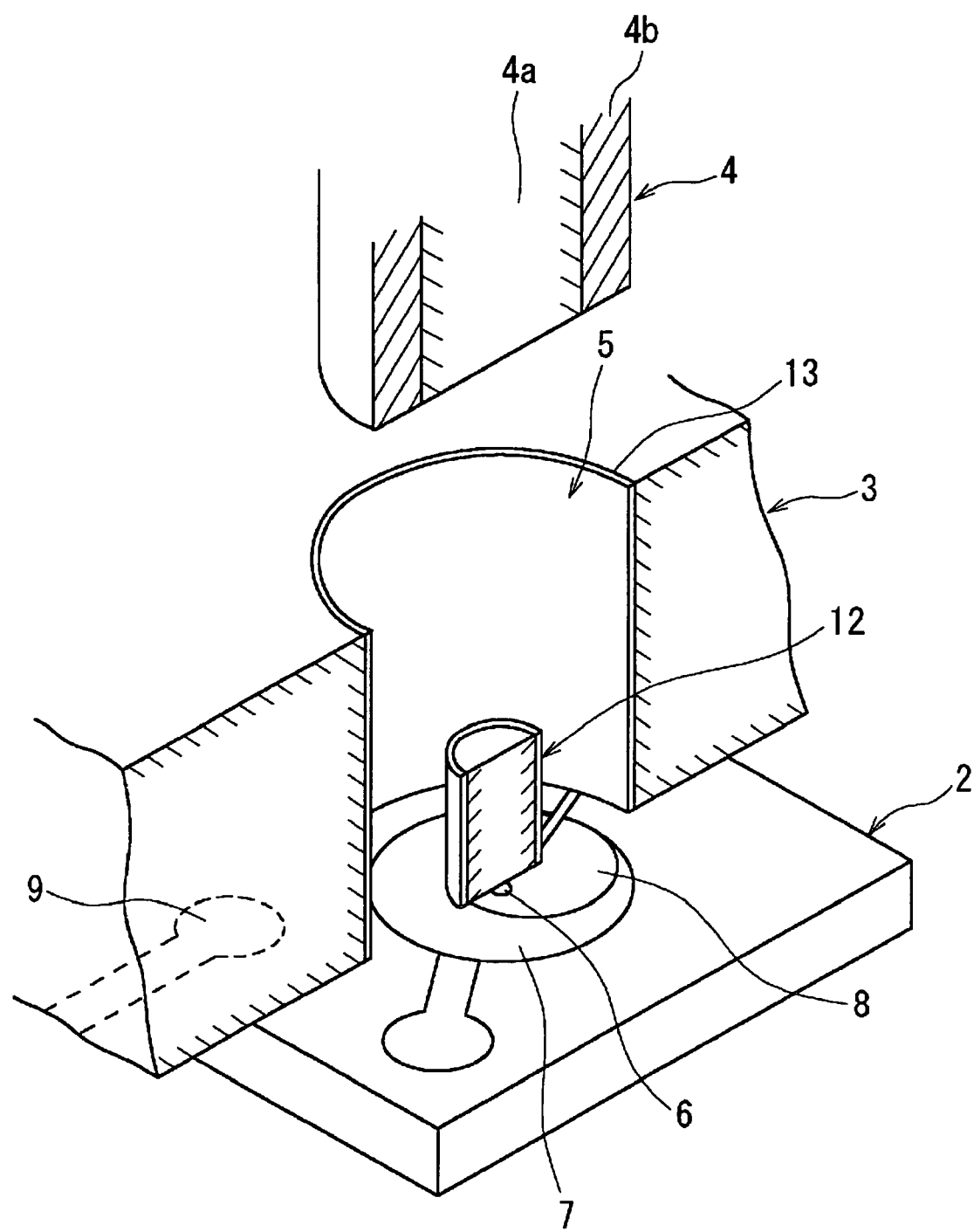
FIG. 19 is a partially broken perspective view showing the example of the mounting step of the optical fiber in the optical transceiver in the third embodiment.

FIGS. 18A, 18b are explanation views showing the example of the mounting step for the optical fiber 4 of the optical transceiver 1c in the third embodiment. FIG. 18A is a side sectional view, and FIG. 18B is a plan view of a main portion thereof. Also, FIG. 19 is a partially broken perspective view showing the example of the mounting step for the optical fiber 4 of the optical transceiver 1c in the third embodiment After the optical integrated chip 2 on which the optical component 12 is mounted is mounted as the flip-chip mounting on the circuit board 3, the optical fiber 4 is inserted into the via hole of the circuit board 3, from the surface side opposite to the optical integrated chip 2. Here, the optical fiber 4 is inserted to the position where its end surface is brought into contact with the other end surface of the optical component 12. Then, the optical fiber 4 is fixed to the circuit board 3 by using the resin 10 as the adhesive.

As mentioned above, since the optical integrated chip 2 and the optical fiber 4 are mounted on the circuit board 3, as shown in FIGS. 14A, 14B and FIG. 15, they are fixed in the condition that the center of the light emitting section 6 of the optical integrated chip 2, the center of the first waveguide 12b of the optical component 12, the center of the via hole 5, and the center of the core section 4a of the optical fiber 4 are approximately coincident.

Consequently, the electric signal inputted to the optical transceiver 1c from external is converted into the optical signal through the light emitting elements (not shown) on the optical integrated chip 2 and the IC or the like formed on the circuit board 3, and becomes the transmitting light to be outputted from the light emitting section 6. The transmitting light is passed through the first waveguide 12b of the optical component 12, inputted to the core section 4a of the optical fiber 4 and sent out to external of the optical transceiver 1c.

Also, the receiving light inputted through the optical fiber 4 from external is inputted to both of the first waveguide 12b of the optical component 12 and the second waveguide 13a formed between the outer surface of the optical component 12 and the inner surface of the via hole 5. The light inputted to the second waveguide 13a is transmitted while reflected by the total reflection film 12a and the total reflection film 13, and inputted to the light receiving section 7 of the optical integrated chip 2 and then outputted as the electric signal through the circuit board 3. Here, the area of the light emitting section 6 is sufficiently small as compared with a sectional area of the first waveguide 12b. Thus, among the receiving lights inputted to the first waveguide 12b and the second waveguide 13a, most of the lights transmitted through the first waveguide 12b drop onto the dead zone 8, and have no influence on the transmitting signal and the receiving signal. In this way, in the optical transceiver 1c in the third embodiment, the paths for the transmitting light and the receiving light are separated to thereby attain the single-wire two-way communication of the full-duplex.

Figure 20:
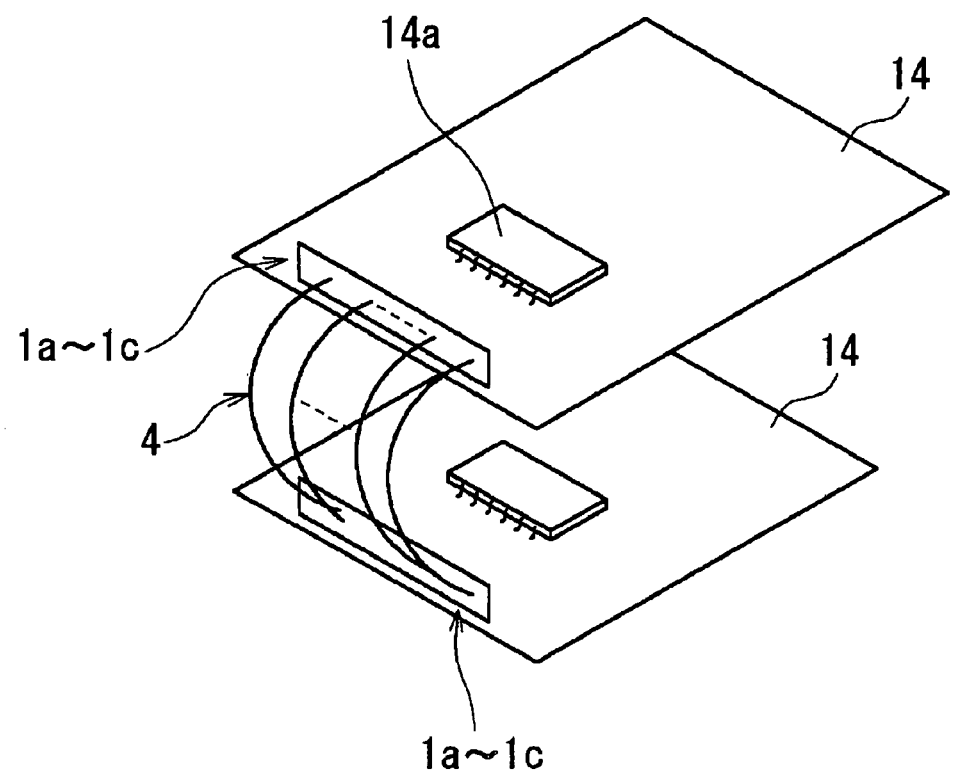
FIG. 20 is a configuration view showing a usage example of the optical transceivers in the first to third embodiments.
Figure 21:
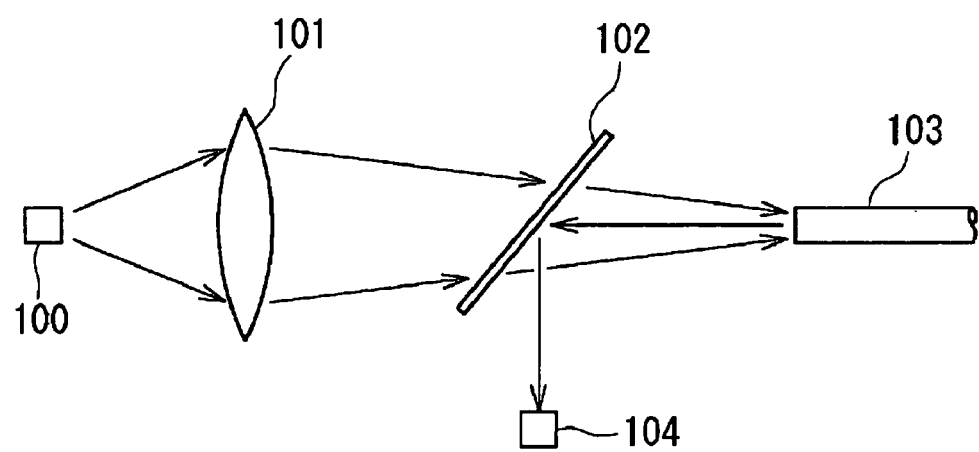
FIG. 21 is a plan view showing a configuration example of a conventional optical transceiver.

The specific usage example of the optical transceivers in the first to third embodiments will be described below. FIG. 20 is a configuration view showing the usage example of the optical transceivers in the first to third embodiments.

The optical transceivers 1a to 1c in the first to third embodiments are used to send, for example, the signal between the boards. As the circuit board 3, the board is used on which a plurality of optical fibers 4 are mounted and the optical integrated chips 2 are mounted correspondingly to the respective optical fibers 4. This circuit board 3 is mounted so as to be stood on a circuit board 14 composed of an IC 14a for processing an image and the like, and the circuit boards 14 are connected through the plurality of the optical fibers 4.

Each of the optical transceivers 1a to 1c in the first to third embodiments is provided with the via hole 5, the optical integrated chip 2 and the like which are formed on the circuit board 3, and each does not require the beam splitter for separating the optical paths, a connector for fixing the optical fiber 4 and the like. Thus, each becomes very small in size. Hence, it is possible to attain the manner in which different circuit boards formed inside an information processor or the like can be connected through multi-conductor optical fibers 4. Also, in each of the optical fibers 4, it is possible to carry out the single-wire two-way communication. Consequently, a large capacity of information can be transmitted at a high speed between the circuit boards. For example, when a transmission rate per optical fiber 4 is assumed to be 1 Gbps, if the circuit boards 14 are connected through the optical fibers 4, it is possible to attain a transmission rate of 32 Gbps.

Thus, it is possible to attain the manner in which the circuit board 14 is divided into two sheets for the sake of miniaturization without any reduction in a processing ability. Although not shown, it may be considered that the transmitting path, which conventionally relies on the circuit pattern, is replaced with the optical fiber by using the optical transceivers 1a to 1c in the first to third embodiments. The optical transceivers 1a to 1c in the first to third embodiments are very small in size, which results in the narrow occupation area on the substrate. On the contrary, the circuit board can be miniaturized correspondingly to the removal of the circuit pattern. Also, since the components can be placed under the optical fiber, the mounting density can be increased.

As mentioned above, in the optical transceivers 1a to 1c in the first to third embodiments, the light emitting element and the light receiving element are integrated on one chip. Thus, the positional precision between both the elements can be made extremely higher than that of the conventional method of separately mounting the respective elements. That is, although the positional precision between the light emitting element and the light receiving element is conventionally determined by the mounting precision of the manufacturing apparatus, the optical integrated chip 2 used in the respective embodiments is obtained at the extremely high precision by the semiconductor manufacturing process. For this reason, it is possible to provide the optical transceiver in which the conductor adjusting step is simplified and the cost is lower as compared with the conventional method.

Also, since the light emitting element and the light receiving element are integrated on one chip, the distance between the light emitting section 6 and the light receiving section 7 can be made shorter than that of the conventional method. Thus, the expensive optical component required to separate the optical path, for example, such as the beam splitter, is unnecessary in attaining the single-wire two-way communication. As a result, it is possible to provide the optical transceiver with low cost.

Moreover, the end surface of the optical component 11 or 12 or the optical fiber 4 is mounted so as to be hit against the light emitting section 6. Thus, it is possible to provide the optical transceiver in which the reflection return light can be reduced and the crosstalk is suppressed.

Also, the via hole 5 made in the circuit board 3 has the function of aligning the optical fiber 4. Thus, the conventional aligning part made of silicon, glass or plastic, for example, the substrate having the V-groove to support the optical fiber is not necessary. Hence, it is possible to provide the optical transceiver in which the number of the components and the number of the assembling steps are small and the cost is low.

Moreover, in the optical transceivers 1b, 1c in the second and third embodiments, since the optical components 11, 12 are used, the optical path on the transmitting side and the optical path on the receiving side are separated. Especially, it is possible to reduce the influence of the leakage of the light to the light receiving section 7 from the light emitting section 6. Thus, it is possible to provide the optical transceiver in which the crosstalk in the full-duplex two-way communication is suppressed. And, since the optical component 11 or 12 is produced only by machining the fiber and the glass tube, this can be attained at the very low cost as compared with the conventionally needed light isolator, and it is possible to attain the optical transceiver in which the cost is low and the crosstalk is suppressed.

As mentioned above, the present invention is the optical transceiver, which includes the light emitting element for converting the electric signal into the optical signal and the light receiving element for converting the optical signal into the electric signal and carries out the single-wire two-way communication by using the optical fiber, and includes: the optical integrated chip in which the light emitting element and the light receiving element are formed on the same chip, and the light emitting section of the light emitting element and the light receiving section of the light receiving element are closely placed; and the circuit board where the via hole into which the optical fiber is inserted is penetrated and made, wherein at the position at which the light emitting section and the light receiving section are fitted into the via hole, the optical integrated chip is installed on one surface of the circuit board, and from the other surface of the circuit board, the optical fiber is inserted into and fixed to the via hole.

Consequently, the transmitting light emitted from the light emitting section is inputted to the optical fiber, and the receiving light from the optical fiber is inputted to the light receiving section. Thus, the single-wire two-way communication can be attained in the simple structure.

Also, the present invention is designed so as to include the optical component for separating the optical path from the light emitting section and the optical path to the light receiving section, wherein this optical component is installed inside the via hole between the optical integrated chip and the optical fiber, and the first waveguide through which the transmitting light is passed and the second waveguide through which the receiving light is passed are formed between the light emitting section and the light receiving section and the end surface of the optical fiber.

Consequently, the transmitting light emitted from the light emitting section is passed through the first waveguide and inputted to the optical fiber, and the receiving light from the optical fiber is passed through the second waveguide and inputted to the light receiving section. Thus, it is possible to provide the single-wire two-way communication of the full-duplex, in which the crosstalk is suppressed under the simple structure, since the transmitting light and the receiving light are separated.

What is claimed is:

1. An optical transceiver including:
   a light emitting element which converts an electric signal into an optical signal;
   a light receiving element which converts the optical signal into an electric signal thereby enabling a single-wire two-way communication by using an optical fiber;
   an optical integrated chip in which said light emitting element and said light receiving element are integrally formed, a light emitting section of said light emitting element and a light receiving section of said light receiving element are coplanar on a surface of said optical integrated chip, and said light receiving section surrounds said light emitting section; and
   a circuit board having a via hole for inserting said optical fiber,
   wherein,
   said optical integrated chip is mounted on one surface of said circuit board at a position where said light emitting section and said light receiving section are fitted into said via hole,
   said optical fiber extends though said via hole from the other surface of said circuit board to a position where an end surface of said optical fiber is brought into contact with said optical integrated chip, and
   said light emitting section and said light receiving section are placed at a distance such that a part of each section is in contact with a diameter portion of a transversal cross-section of a core of said optical fiber.

2. The optical transceiver according to claim 1, wherein an electrode pad to be connected to said optical integrated chip is on one surface of said circuit board, and said optical integrated chip is mounted on said circuit board by flip-chip mounting.

3. The optical transceiver according to claim 1, wherein said via hole is formed by laser beam machining.

4. The optical transceiver according to claim 1, wherein a circuit for driving said optical integrated chip is on said circuit board.

5. An optical transceiver including:
   a light emitting element which converts an electric signal into an optical signal;
   a light receiving element which converts an optical signal into an electric signal thereby enabling a single-wire two-way communication by using an optical fiber;
   an optical integrated chip in which said light emitting element and said light receiving element are integrally formed, and a light emitting section of said light emitting element and a light receiving section of said light receiving element are coplanar on a surface of said optical integrated chip at a distance such that a part of each one of said light emitting section and of said light receiving section is in contact with a diameter portion of a transversal cross-section of a core of said optical fiber, and said light receiving section formed around said light emitting section;
   a circuit board having a via hole for inserting said optical fiber; and
   an optical component which separates an optical path from said light emitting section and an optical path to said light receiving section,
   wherein,
   said optical integrated chip is mounted on one surface of said circuit board at a position where said light emitting section and said light receiving section are fitted into said via hole,
   said optical fiber extends through said via hole from the other surface of said circuit board to a position where an end surface said optical fiber is brought into contact with the one surface of said optical integrated chip, and
   said optical component is inside said via hole between said optical integrated chip and said optical fiber, and a first waveguide through which a transmitting light is passed and a second waveguide through which a receiving light is passed are between said light emitting section and said light receiving section and an end surface of said optical fiber.

6. The optical transceiver according to claim 5, wherein said optical component is a fiber in which a periphery of an inner layer section is covered by an outer layer section whose refractive index is different, and this outer layer section is covered by a total reflection film, and said first waveguide is such that said inner layer section is opposite to said light emitting section, and said second waveguide is such that said outer layer section is opposite to said light receiving section.

7. The optical transceiver according to claim 5, wherein said optical component is a fiber covered by a total reflection film, and said first waveguide is such that said optical component is opposite to said light emitting section, and a total reflection film is formed on an inner surface of said via hole, and said second waveguide is between said via hole and said optical component.

8. The optical transceiver according to claim 5, wherein an electrode pad connected to said optical integrated chip is on one surface of said circuit board, and said optical integrated chip is mounted by flip-chip mounting on said circuit.

9. The optical transceiver according to claim 5, wherein said via hole is formed by laser beam machining.

10. The optical transceiver according to claim 5, wherein a circuit for driving said optical integrated chip is at least formed on said circuit board.

* * * * *